March 7, 1944.  L. SCUSA  2,343,331

MANUFACTURE OF CONTAINERS AND THE LIKE

Filed Jan. 12, 1939  14 Sheets-Sheet 1

INVENTOR
Lino Scusa
BY Maréchal & Hoe
ATTORNEYS

March 7, 1944.  L. SCUSA  2,343,331
MANUFACTURE OF CONTAINERS AND THE LIKE
Filed Jan. 12, 1939   14 Sheets-Sheet 3

INVENTOR
Lino Scusa
BY Maréchal & Noe
ATTORNEYS

March 7, 1944.    L. SCUSA    2,343,331
MANUFACTURE OF CONTAINERS AND THE LIKE
Filed Jan. 12, 1939    14 Sheets-Sheet 4
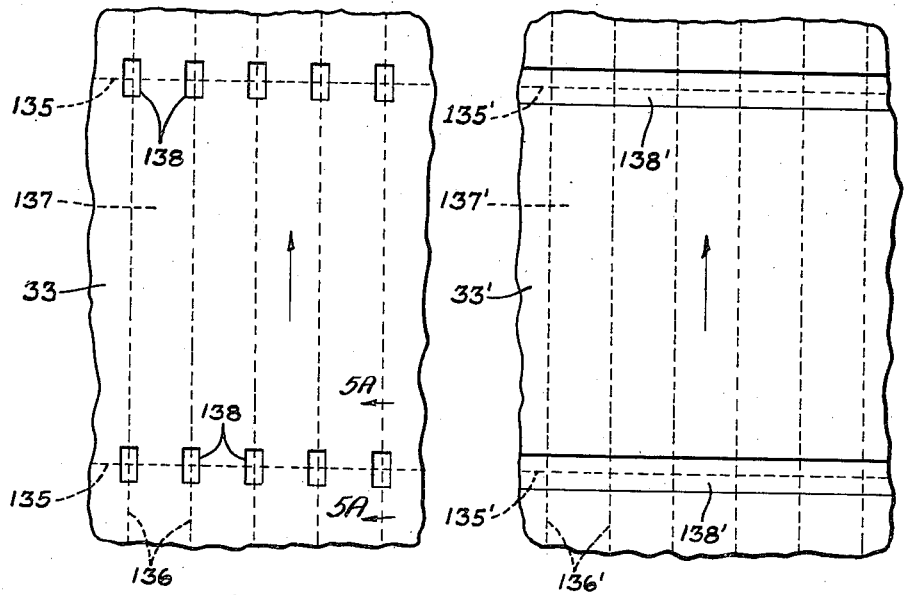
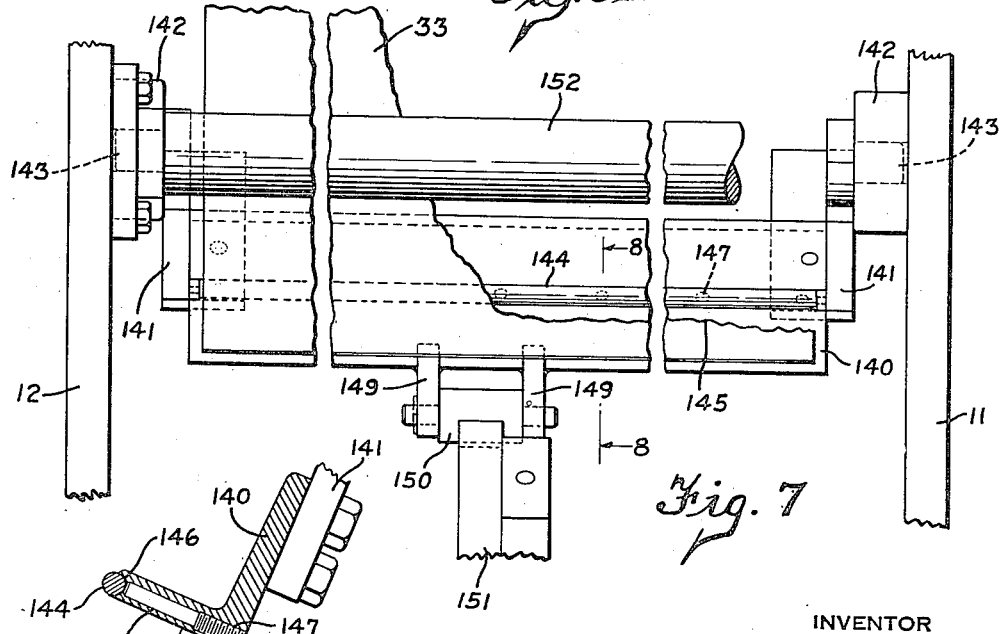
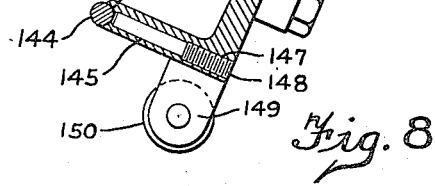
INVENTOR
Lino Scusa
BY Maréchal & Noe
ATTORNEYS March 7, 1944.　　　　L. SCUSA　　　　2,343,331
MANUFACTURE OF CONTAINERS AND THE LIKE
Filed Jan. 12, 1939　　14 Sheets-Sheet 5

INVENTOR
Lino Scusa
BY
Maréchal & Noe
ATTORNEYS

March 7, 1944.  L. SCUSA  2,343,331
MANUFACTURE OF CONTAINERS AND THE LIKE
Filed Jan. 12, 1939  14 Sheets-Sheet 7
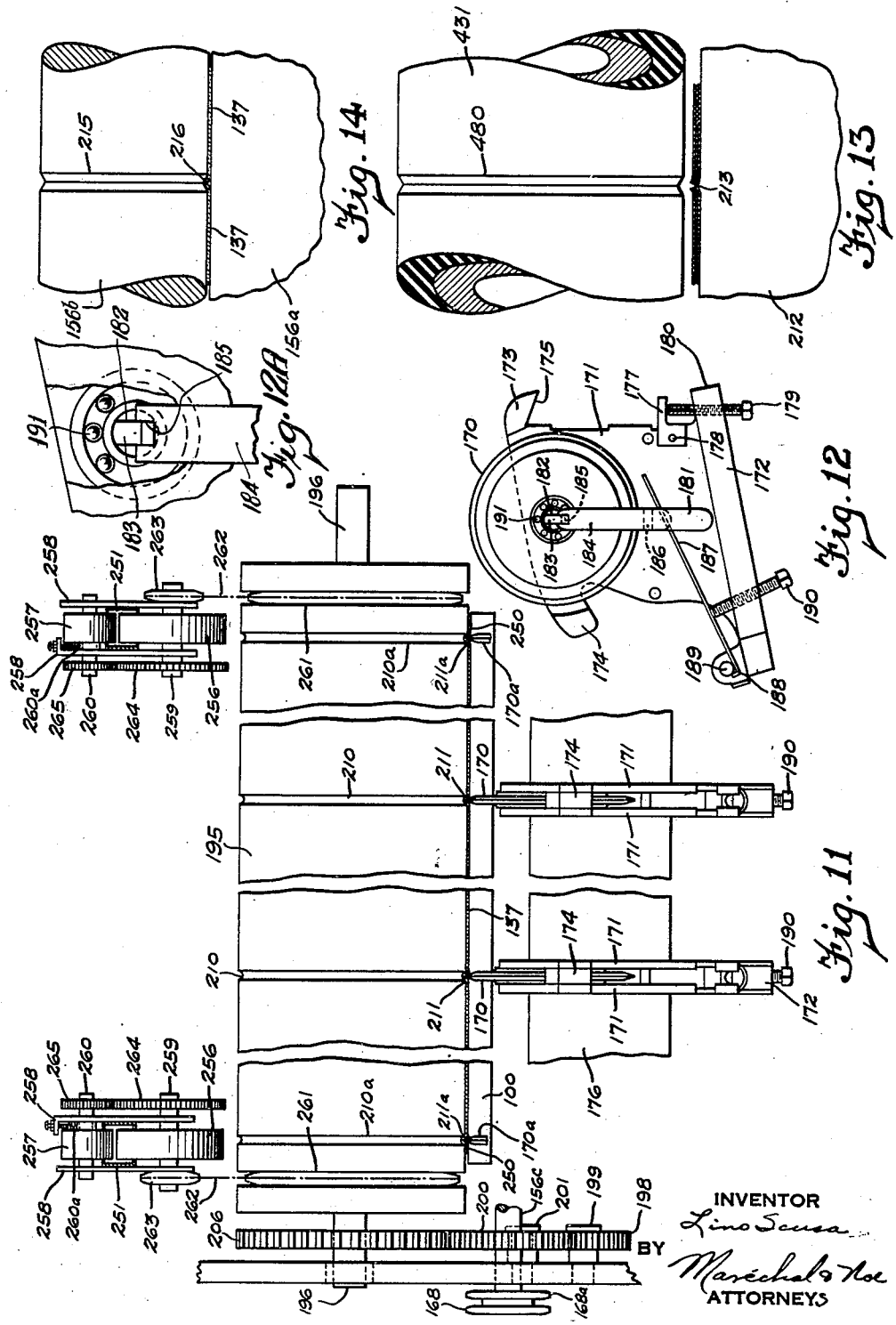
INVENTOR
Lino Scusa
BY
Maréchal & Noe
ATTORNEYS

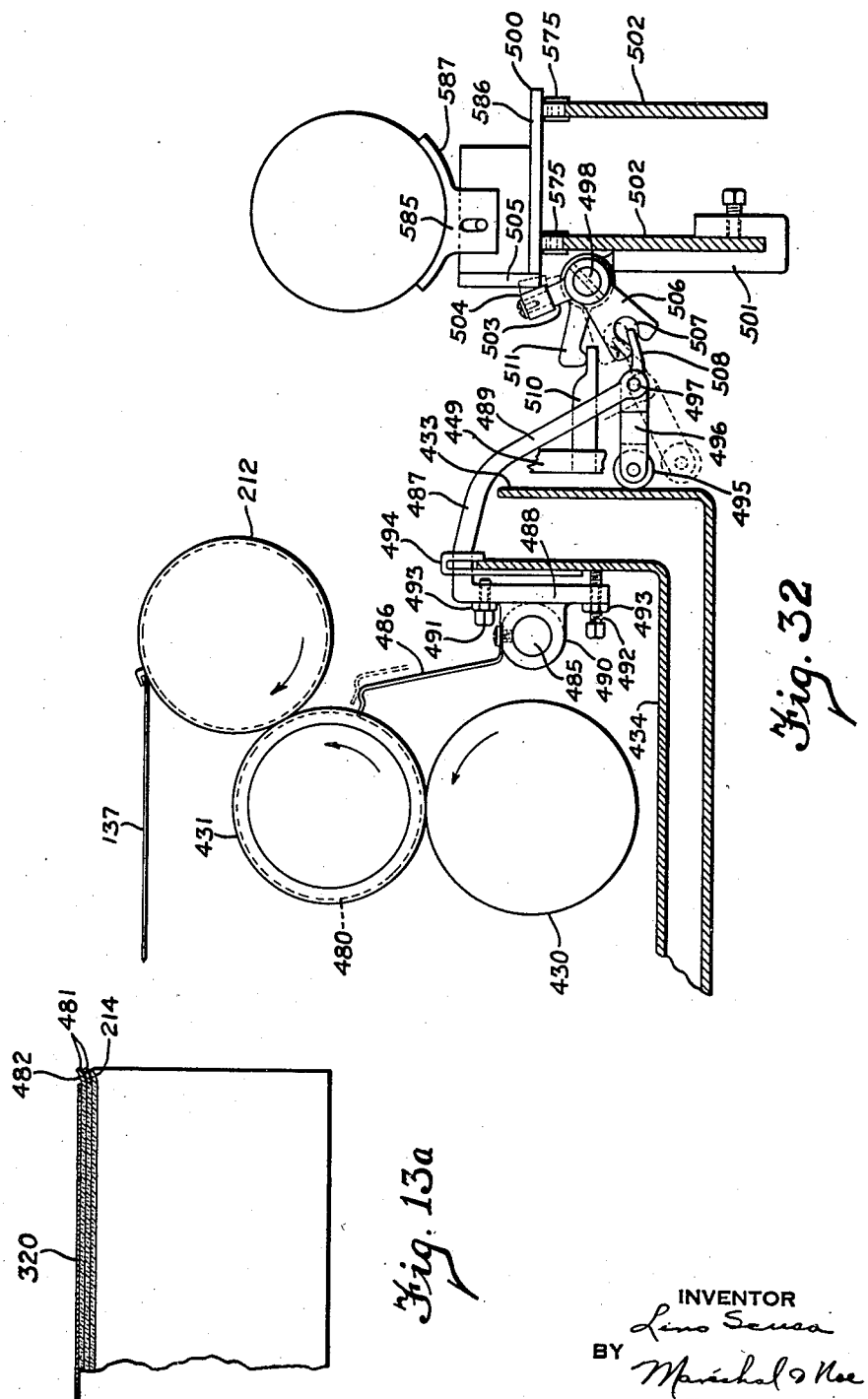

March 7, 1944.    L. SCUSA    2,343,331
MANUFACTURE OF CONTAINERS AND THE LIKE
Filed Jan. 12, 1939    14 Sheets-Sheet 9
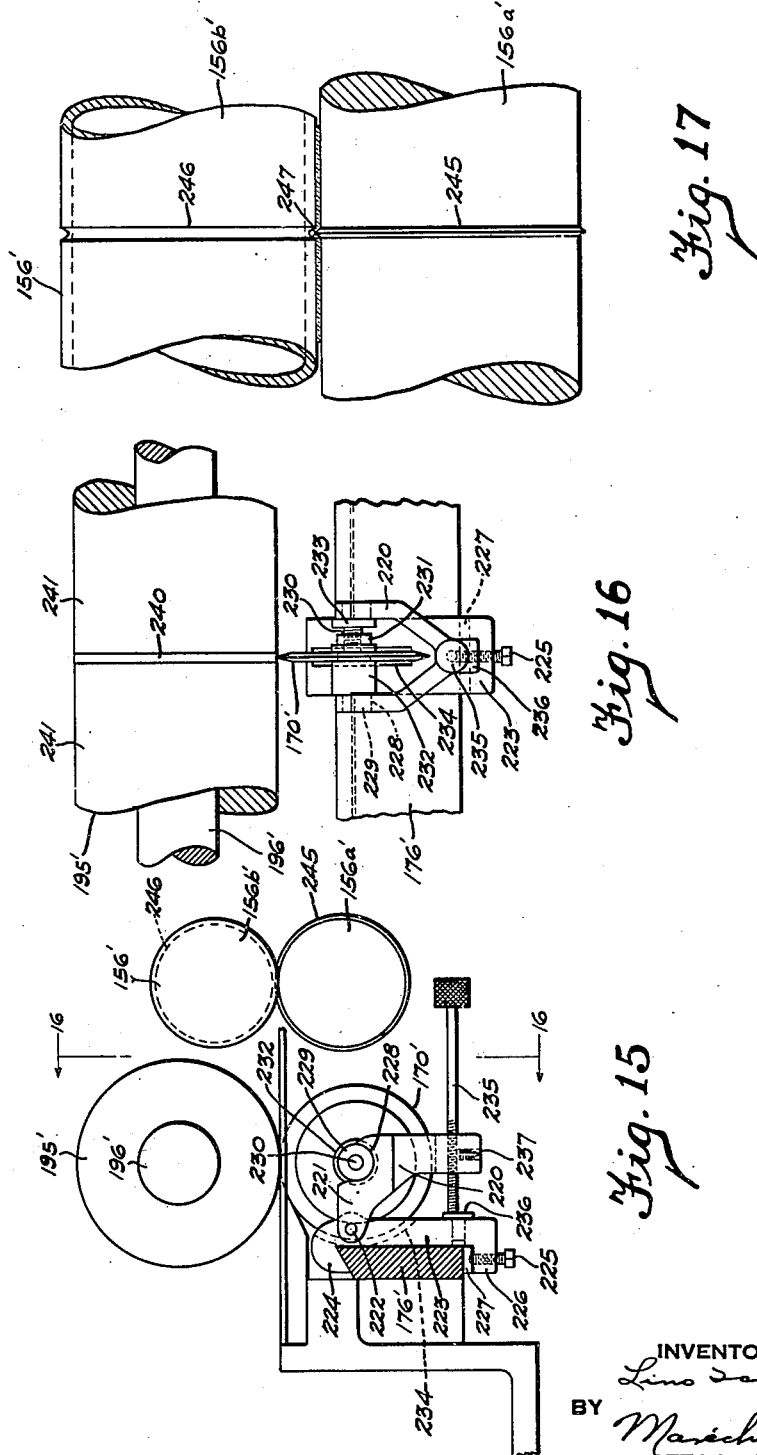

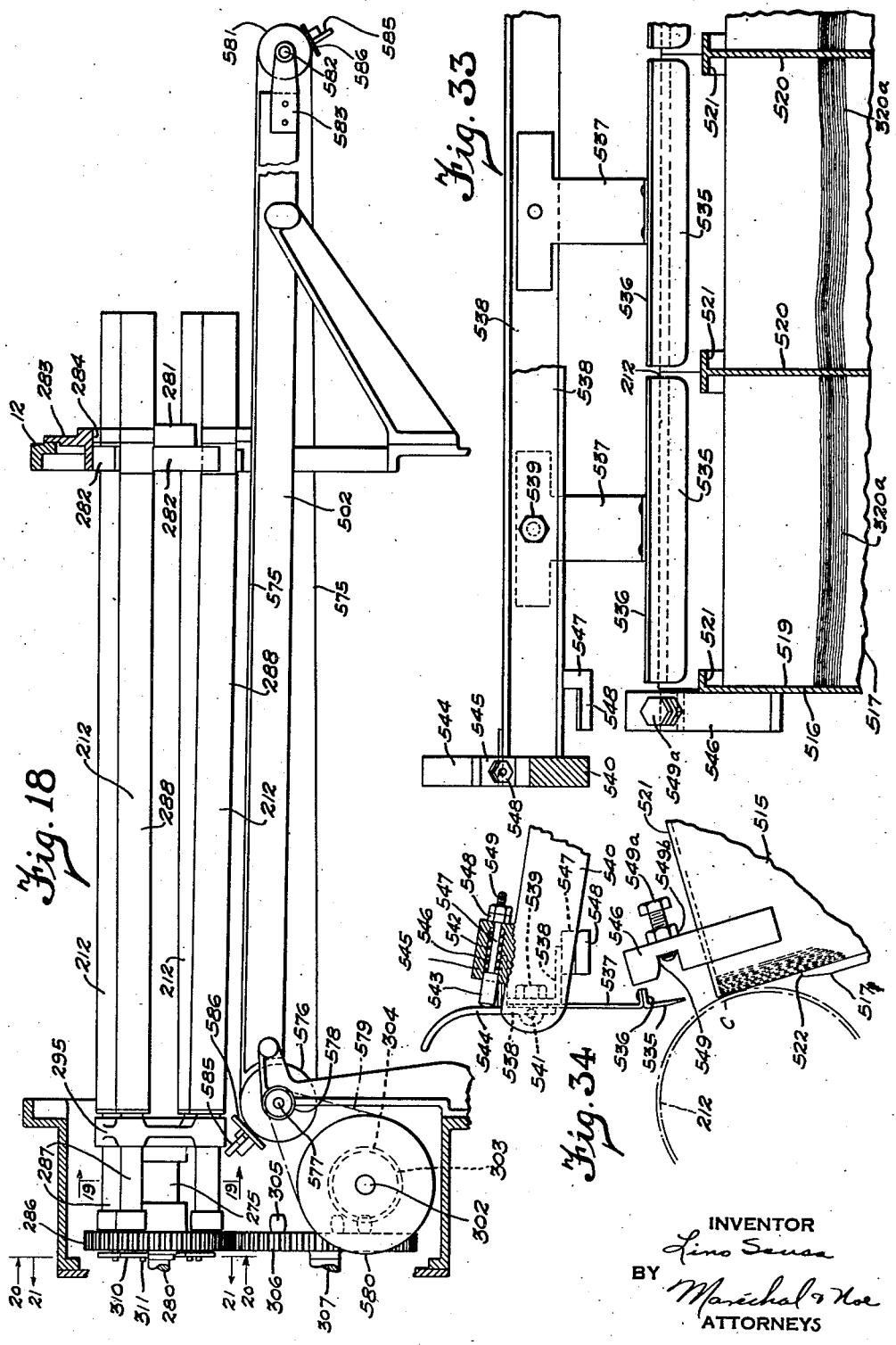

March 7, 1944. L. SCUSA 2,343,331
MANUFACTURE OF CONTAINERS AND THE LIKE
Filed Jan. 12, 1939 14 Sheets-Sheet 11
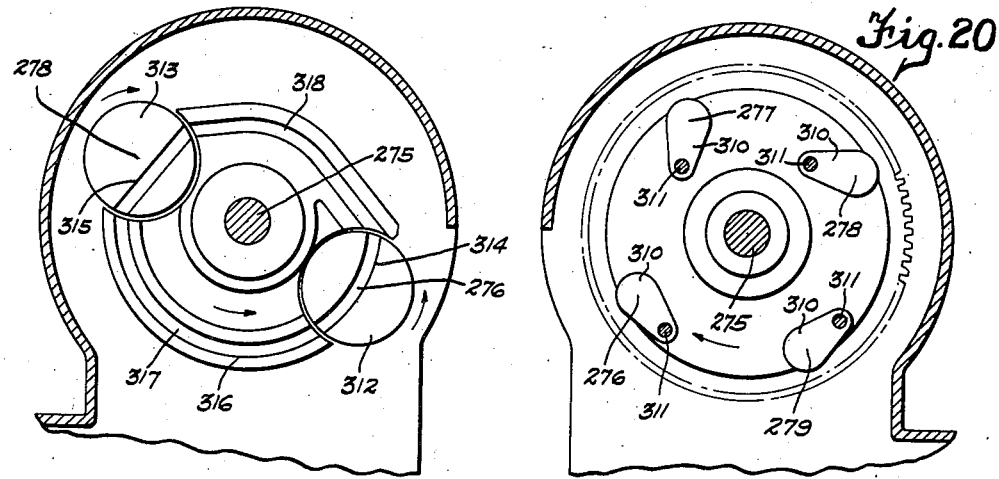
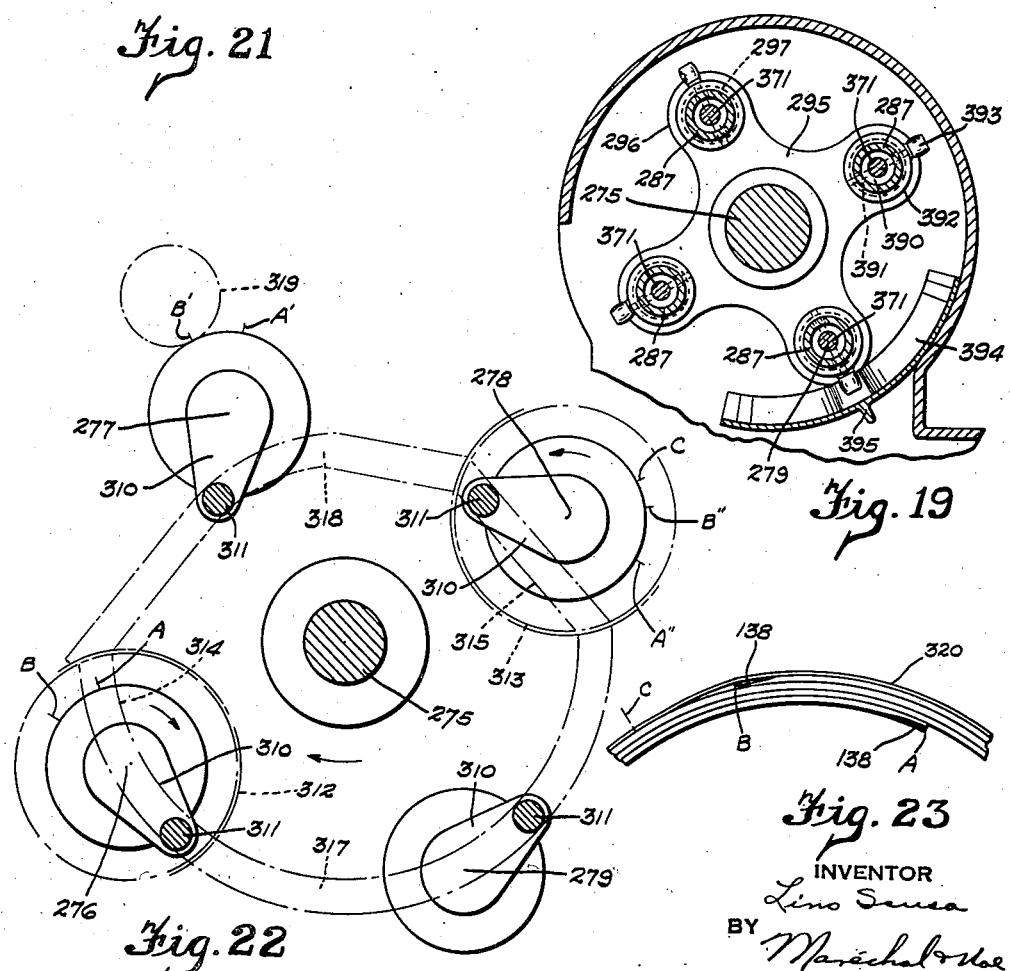
INVENTOR
Lino Scusa
BY Maréchal & Moe
ATTORNEYS March 7, 1944.  L. SCUSA  2,343,331
MANUFACTURE OF CONTAINERS AND THE LIKE
Filed Jan. 12, 1939  14 Sheets-Sheet 12
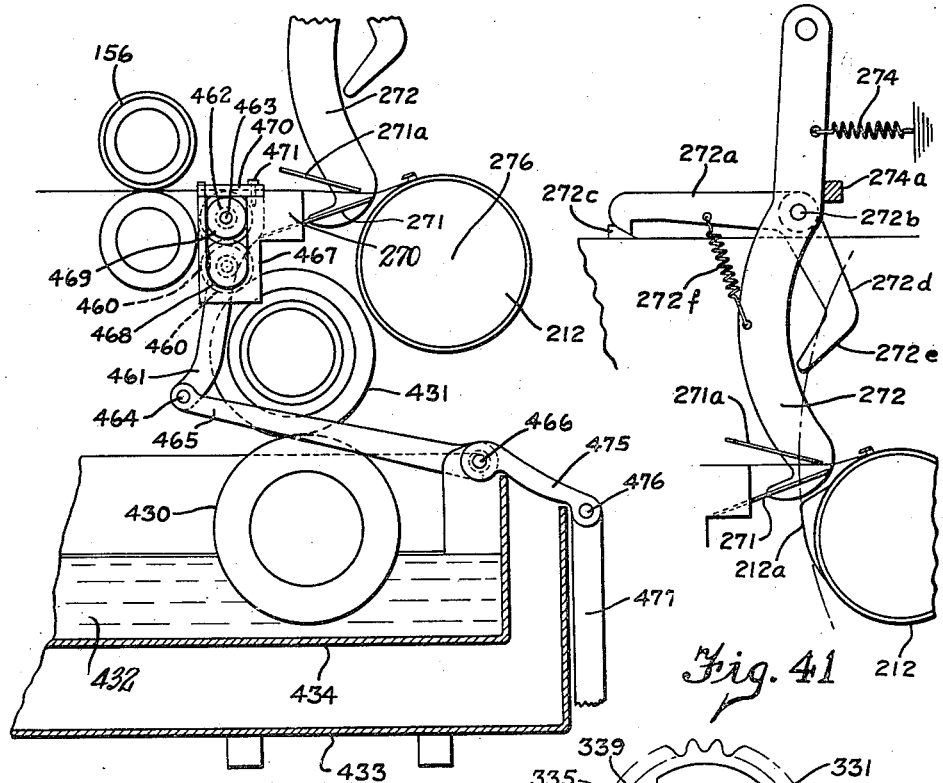
Fig. 31
Fig. 41
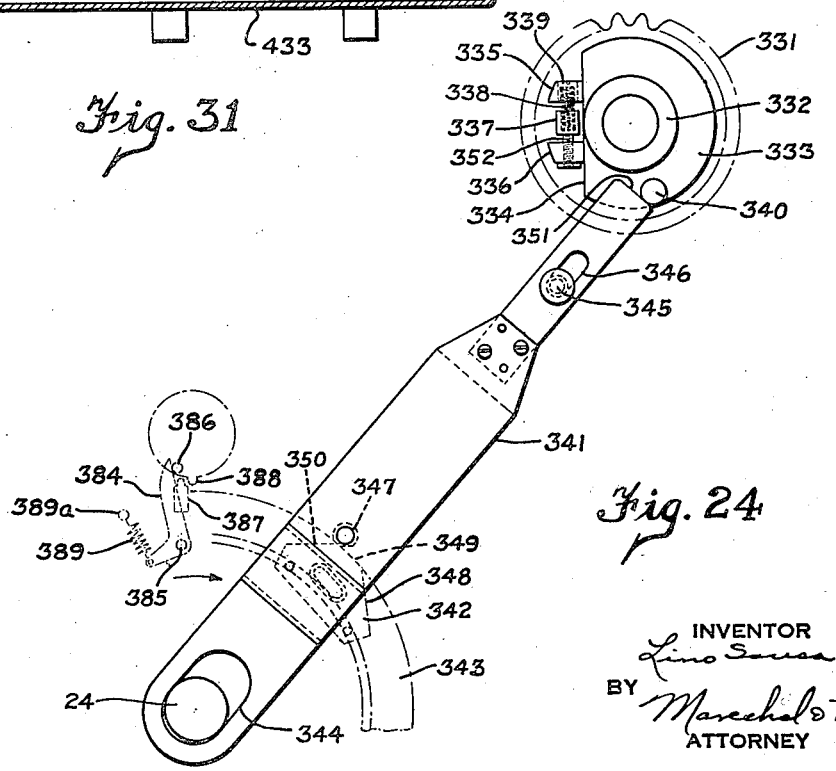
Fig. 24
INVENTOR
Lino Scusa
BY Marechal & Noe
ATTORNEY March 7, 1944.  L. SCUSA  2,343,331
MANUFACTURE OF CONTAINERS AND THE LIKE
Filed Jan. 12, 1939  14 Sheets-Sheet 13

INVENTOR
Lino Scusa
BY Maréchal & Noe
ATTORNEYS

March 7, 1944.    L. SCUSA    2,343,331
MANUFACTURE OF CONTAINERS AND THE LIKE
Filed Jan. 12, 1939    14 Sheets-Sheet 14

INVENTOR
Lino Scusa
BY
Maréchal o Hue
ATTORNEYS

Patented Mar. 7, 1944

2,343,331

UNITED STATES PATENT OFFICE

2,343,331

MANUFACTURE OF CONTAINERS AND THE LIKE

Lino Scusa, Phoenix, N. Y., assignor, by mesne assignments, to Continental Can Company, Inc., New York, N. Y., a corporation of New York Application January 12, 1939, Serial No. 250,477

44 Claims. (Cl. 93—81)

This invention relates to the manufacture of container bodies, and more particularly to a process and apparatus for the rapid, continuous, and complete production of container bodies from a sheet of paper material or the like.

The bodies as thus produced are adapted to have end closures applied thereto and provide an inexpensive and easily destructible container adapted to be used for a large variety of purposes. When the interior surface of the container body has suitable impervious surfacing material applied thereto the container is particularly adapted for the packaging of food products, paints, oils, greases, and other oily or greasy substances. The surfacing material which may be greaseproof in character is preferably applied to the paper sheet from which the container body is wound but may be separately applied to the formed container body. When the body is formed from a previously treated sheet of paper material the raw edges at the inner seam and at the ends of the body are preferably treated with a suitable impervious sealing material prior to the application of the end closures to prevent wicking of the contents of the filled container into the wall of the body portion. Metal end closures are preferably used and they are crimped onto the body portion in leakproof, sealed relationship with the interior thereof.

The invention provides for the cutting of a sheet of paper material, preferably supplied from a large jumbo roll, into a plurality of strips or blanks of suitable size to be wound on a mandrel into the form of a convolute container body, for the simultaneous winding of a plurality of adhesively secured container bodies, for the application of labels thereto, and for the discharge of the completed bodies. To effect the rapid and continuous formation and discharge of the container bodies, complete with label attached, a plurality of mandrels are provided and these mandrels are successively indexed to a plurality of stations where the winding of the paper strip into the form of adhesively secured container bodies, the application of labels to the formed containers, and the discharge of completed bodies are simultaneously performed. Reference is made herein to a copending application Serial No. 165,352, filed September 23, 1937, by Lino Scusa and Rudolph Kilian, now Patent No. 2,163,318, and assigned to the same assignee as this application and which likewise relates to an invention of this same general character.

One of the principal objects of the invention is the provision of a process of this character which provides for the high speed and quantity production of tightly wound container bodies which maintain their shape upon the completion of the winding operation and which are adapted to more readily receive end closures in impervious, sealed relationship to the interior of the body and without damage to the paper body or any surfacing material thereon.

A further object is the provision of a process of this character in which the sheet of paper material is so treated as to cause a substantial portion of the outer lap of the formed body including the trailing end of the body blank to tend to curl upon itself and adhere to the shape of the formed container body without the necessity of a prolonged ironing operation to secure the edge of the sheet against unwinding.

A further object is the provision of a process of this character which provides for the formation of container bodies in which the thickness of the paper material at the ends of the inner and outer seams is reduced to facilitate the application of end closures in impervious, sealed relationship to the interior of the body.

A further object is the provision of a process of this character which provides for the formation of container bodies in which the ends of the formed body flare outwardly to facilitate the application of end closures without injury to the paper body or any surfacing material thereon.

A further object is the provision of a process of this character in which the paper material is so cut as to provide a blank having sharp, clean-cut, unfrayed side edges adapted to readily receive a coating of sealing material and prevent wicking of the contents of the container body, and in which the severed edges are bent in such manner as to cause the ends of the formed body to turn outward to facilitate application of the end closures without damage to the paper body or the sealing material thereon.

A further object is to provide a process of this character for forming multi-wall wound container bodies having reinforced end portions adapted for the reception of closure members thereon.

A further object is to provide a process of this character for forming multi-wall wound container bodies having adhesive applied between the wall layers to secure the body in wound form, and in which the ends of the wound container body are reinforced by the application of an increased quantity of adhesive to portions of the inner layers that lie adjacent the ends of the formed body.

A further object is to provide a process of this character for forming container bodies having an outer coating of adhesive for receiving a label and in which the end portions of the body which are adapted to receive closure members are substantially free of adhesive.

A further object is the provision of a process of this character which provides for the application of adhesive to secure the sheet in wound container form and in which an excess quantity of adhesive is applied at the inner seam of the paper material to cause the inner edge of the material to be firmly held in position.

A further object is the provision of a simple and effective process for applying a label in predetermined positioning with respect to the outer seam of the formed container body and adhesively securing the same in position thereon.

A further object is to provide a process for forming wound container bodies in which a label is applied and adhesively secured in such manner as to overlie the outer seam of the formed body and assist in holding the body in the wound form shortly after label application begins.

A further object is to provide simple and effective apparatus for carrying out the above described processes.

A further object is the provision in apparatus of this character of an improved means for slitting a web or sheet of paper material into strips or blanks that have sharp, clean-cut and unfrayed side edges that are adapted to readily receive a coating of sealing material and prevent wicking of the contents of the container body.

A further object is the provision in apparatus of this character of a slitting means which provides for the ready removal and replacement of individual knives, for adjusting the positioning of the knives to provide a desired spacing therebetween, and for individually adjusting the cutting pressure between each knife and a cooperating roll or the like.

A further object is to provide a wound container body adapted to receive end closure members thereon and in which the ends of the wound body have portions of reduced thickness to facilitate the application of the end closures thereon in fluid sealed relation.

A further object is to provide a container body having stiffened end portions flaring slightly outwardly to receive end closures thereon.

Other objects and advantages will be apparent from the following description, the appended claims, and the accompanying drawings, in which:

Fig. 3A is a partial sectional view of one form of the device for reducing the thickness of the paper material;

Fig. 5 is a view illustrating a fragmentary portion of the supply web after it has passed a skiving cutter;

Fig. 5A is a cross sectional view through the paper strip showing the reduced thickness area thereof;

Fig. 6 is a similar view illustrating a fragmentary portion of the supply web after it has passed a modified skiving cutter;

Fig. 7 is a fragmentary elevational view taken on the line 7—7 of Fig. 4 and showing a front view of the mechanism for providing a curling tendency in predetermined portions of the paper web;

Fig. 8 is an enlarged fragmentary sectional view taken on the line 8—8 of Fig. 7;

Fig. 11 is a fragmentary view looking towards the supply end of the machine and showing the slitter means for separating the paper sheets into strips and the feed means for advancing the trim strips through the trim conveyor tubes;

Fig. 12 is a side elevational view of one of the slitter knives with one of the side frames of the supporting structure removed;

Fig. 12A is a detail view on an enlarged scale showing the support for the slitter shaft;

Fig. 13 is a fragmentary plan view of a mandrel at the winding station and the roll for applying adhesive to the paper strips during winding on the mandrel and illustrates the relationship between the up-bent side edges of the body blanks and the grooves in the adhesive applying roll;

Fig. 13A is a fragmentary sectional view through one end of a container body complete with label attached;

Fig. 14 is a fragmentary elevational view of the pair of feed rolls which advance the paper strips from the slitter means to the winding mandrel;

Fig. 15 is a fragmentary elevational view looking towards the right-hand side of the machine and showing a modified form of the slitter means and the feed rolls for advancing the paper strips from the slitter to the winding mandrel;

Fig. 16 is a fragmentary elevational view taken on the line 16—16 of Fig. 15;

Fig. 17 is a fragmentary elevation of the modified form of feed rolls illustrated in Fig. 15;

Fig. 18 is a fragmentary view looking towards the delivery end of the machine and showing the mandrel assembly in elevation;

Fig. 19 is a fragmentary sectional view taken on the line 19—19 of Fig. 18 and showing a portion of the mandrel assembly structure;

Fig. 20 is a fragmentary sectional view taken as indicated at 20—20 on Fig. 18 and showing the driven ends of the mandrels;

Fig. 21 is a fragmentary sectional view taken on the plane of Fig. 20 but looking in the opposite direction as indicated by the line 21—21 on Fig. 18 and showing the mandrel driving heads and guiding track in elevation;

Fig. 22 is a diagrammatic illustration looking in the direction of Fig. 20 with the parts of Fig. 21 superimposed thereon;

Fig. 23 is a fragmentary diagrammatic view illustrating the relationship between the seams of the container body and the positioning of the label;

Fig. 24 is a fragmentary elevational view looking towards the right-hand side of the machine and showing the indexing stop and tensioning mechanism for the mandrel driving head at the winding station;

Fig. 31 is a fragmentary elevational view looking towards the right-hand side of the machine and showing the mechanism for applying an initial coating of adhesive on a predetermined portion of the body blanks that directly overlies the leading end of the blank when wound on a mandrel at the winding station;

Fig. 32 is a fragmentary elevational view looking towards the right-hand side of the machine and showing the mechanism for scraping adhesive from the grooves in the adhesive applying roll during a predetermined portion of the operating cycle of the machine;

Fig. 33 is a fragmentary view taken transversely of the machine on the line 33—33 of Fig. 4 and illustrating a portion of the label applying mechanism;

Fig. 34 is a fragmentary side elevational view taken at right angles to the plane of Fig. 33;

Fig. 41 is a fragmentary detail view of the mechanism for guiding the paper strips into the grippers carried by a mandrel at the winding station.

Figure 1:
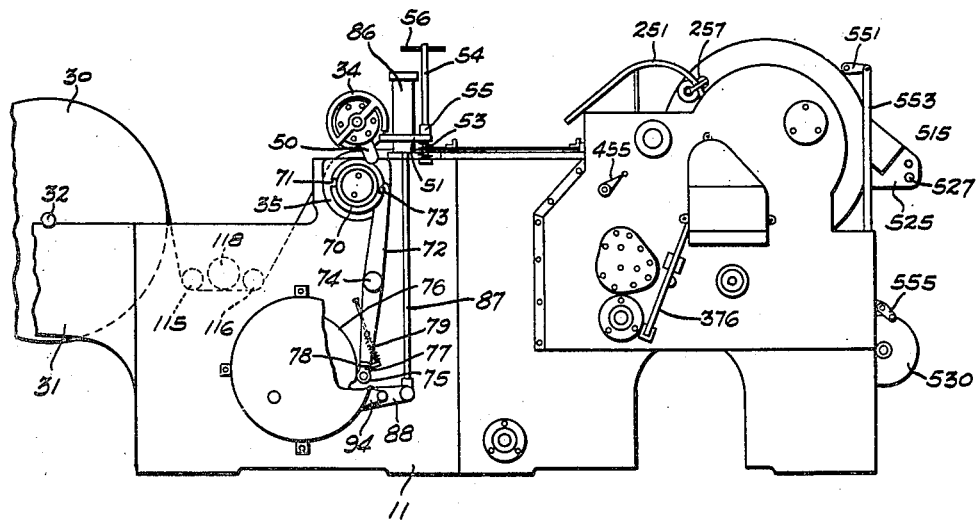
Fig. 1 is a side elevational view, partly broken away, of a machine constructed in accordance with the invention and designated, when considered from the supply or feeding end, as a right-hand elevational view.

Referring to the drawings which illustrate a preferred embodiment of the invention, and in which like reference characters designate like parts in the several views, the machine is shown as comprising a unitary organization in which the various operative parts are supported in proper operative relationship by means of a main frame structure having side members 11 and 12. That side of the machine illustrated in Fig. 1 and identified as the right-hand side of the machine has the frame member indicated by the numeral 11, while that side of the machine illustrated in Fig. 2 and designated as the left-hand side of the machine has the main frame member designated by the numeral 12.

Figure 4:
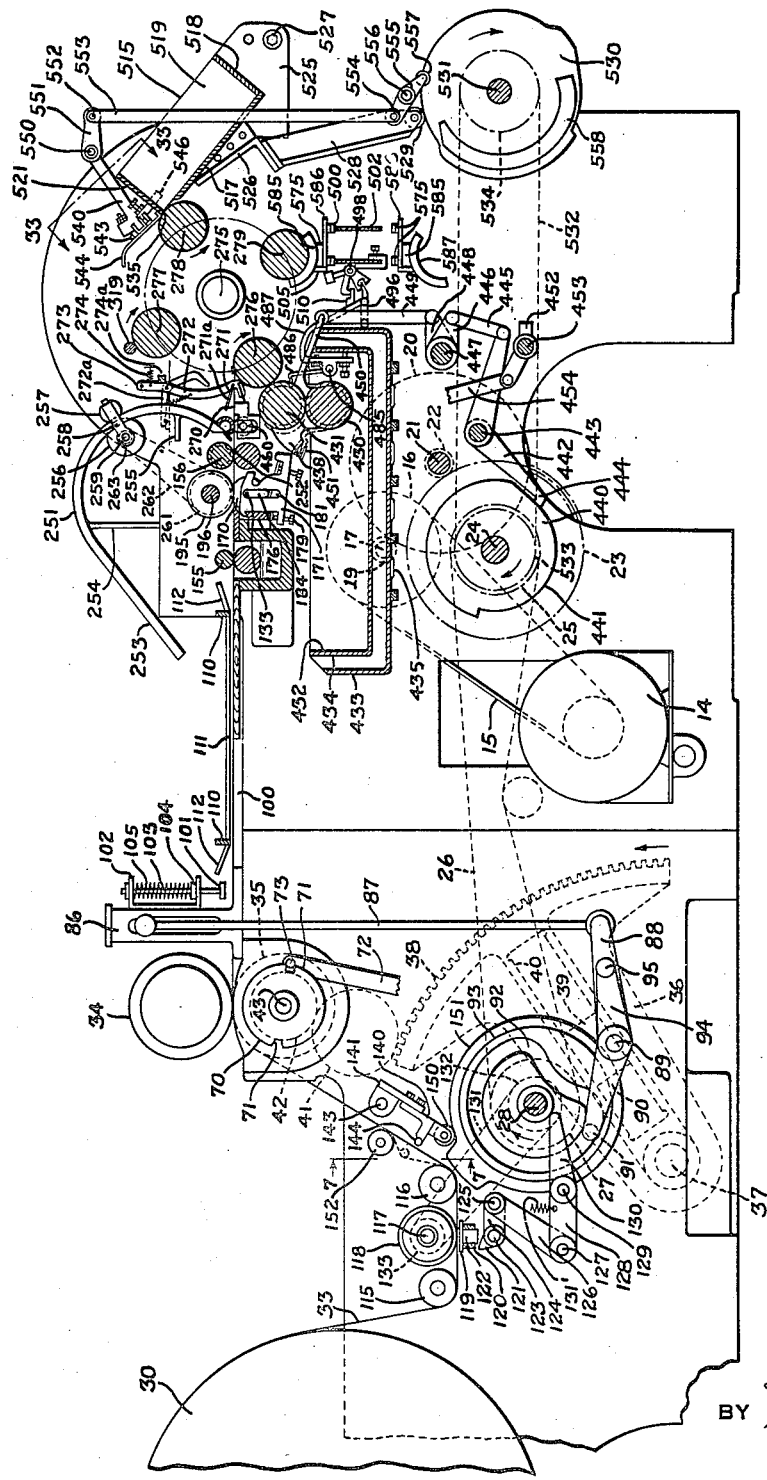
Fig. 4 is an elevational view, somewhat diagrammatic in character, and looking toward the right-hand side of the machine.

The machine organization is so arranged that all of the several operating parts are actuated from a single power source which is illustrated as a motor 14 in Fig. 4. As shown in this view the drive from the motor comprises a belt 15 which connects the motor to a pulley 16 that is fixed on a shaft 17. The shaft 17 projects through the left-hand frame member 12 and has affixed thereto a hand wheel 18 by which the machine may be moved manually. The shaft 17 carries a pinion 19 which meshes with a large gear 20 that is carried by a shaft 21. The shaft 21 also carries a pinion 22 and a driving connection between the gear 20 and the pinion 21 is selectively obtained through the medium of a clutch (not shown) which operates therebetween. Pinion 22 meshes with a large gear 23 that is fixed to a shaft 24 from which driving connection is made to the several operating centers.

Included among the driving members on the shaft 24 is a sprocket 25 over which runs a chain 26 connecting to a sprocket 27 on a shaft 28 that serves to drive and control several of the operating mechanisms positioned adjacent the paper supply end of the machine. In the illustrated embodiment of the invention the paper is supplied from a jumbo roll 30 that is shown as supported upon arms 31 extending laterally from the ends of the frame members 11 and 12. The arms are constructed to rotatably carry the shaft 32 of the supply roll 30.

As mentioned briefly above, the paper may be given a surface coating to render it impervious to the passage of the container contents. In the case of containers that are used for an oily substance the surfacing is in the nature of a grease-proofing treatment and may comprise a composite layer of which the initial coating functions to impart flexibility and the final coating is principally greaseproof in character. Satisfactory results have been obtained where the greaseproof layer comprises a cellulose ester material such as nitrocellulose and the coating surfacing formed in accordance with the Swan patents, 1,957,368; 1,957,369 and 2,039,361, assigned to the same assignee as this application.

The paper web which is designated by the numeral 33 is unwound from the roll 30 by means of a pair of feed rolls 34 and 35 which advance the web into a position to be sheared by a cut-off knife into sheets having a length in the direction of feeding movement that is sufficient to form a convolute container body of the desired size and number of turns. The feed rolls 34 and 35 are intermittently driven to advance the proper length of paper web in coordinated timed relationship to the operation of the cut-off knife. This intermittent drive of the feed rolls is obtained through a rockable member 36 that is pivoted to the machine frame at 37 and carries a gear sector 38. The member 36 is driven from the continuously rotating shaft 28 by means of a crank arm 48 (Fig. 2) which is carried by the shaft 28 and connects with a slide block 39 that is reciprocal in a guideway 40 of the member 36. The gear sector 38 meshes with a gear 41 which in turn meshes with a gear 42 that turns freely on the shaft 43 of the lower feed roll 35.

Figure 2:
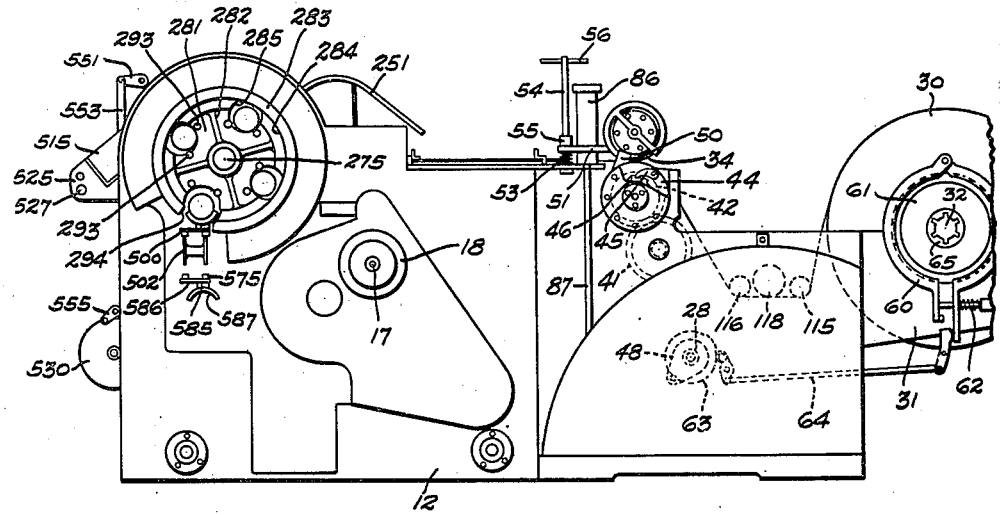
Fig. 2 is a similar elevational view taken from the opposite side of the machine and designated as a left-hand elevational view.

As shown in Fig. 2 the gear 42 carries a plate 44 that carries a pawl 45 that is adapted to engage the teeth of a ratchet 46 fixed to the shaft 43 of the lower feed roll. The feed rolls 34 and 35 are intergeared so that rotation of the lower roll causes a corresponding rotation of the upper roll. Rotation of the shaft 28 rocks the member 36 which results in advance of the feed rolls through the medium of the pawl and ratchet connection during one direction of travel of the member 35. This advancing movement is timed with respect to other operations of the machine so that paper feed occurs at a proper time of the operating cycle of the machine.

Because of the intermittent feed of the supply roll it is alternately in motion and at rest. The arrangement of the feed drive is such that the supply roll is gradually accelerated from the rest position to maximum travel and is gradually slowed down to the rest position. Consequently the supply roll movement is such as to minimize the possibility of slippage in the feed rolls. The mounting of the feed rolls is also such that they may be urged together under tension to provide a positive drive. As shown in Figs. 1 and 2 the upper feed roll is carried by brackets 50 that are pivotally mounted on the side frames 11 and 12 and are provided with arms 51 that project laterally of the brackets adjacent the side frames. Coil springs 53 are provided between the side frames and the under side of the arms 51 and act upon the arms to urge the upper roller 34 towards the lower roller 35. This movement is limited by members 54 which are provided with shoulders 55 adapted to engage the upper side of the arms 51 and have a screw threaded connection with the side frames of the machine. Handles 56 are provided for rotating the members 54 to adjust the elevation of the shoulders 55. The position of shoulder 55 may thus be varied to adjust and limit the gap between the feed rolls, and the member 54 additionally provides a means for causing a relatively wide separation between the feed rolls for the initial threading of the paper web.

Utilization of a jumbo roll as a supply source permits continued operation of the machine for an extended period as the rolls as furnished have a diameter of the order of 48 inches. To insure and maintain positioning of the paper supply with respect to the feed roll operation so that the supply roll may not overrun at the end of the feeding movement and may not, as a result of some condition of overbalance existing in the roll, tend to turn backwards at the end of feeding movement the machine is provided with means to positively stop the supply roll at the termination of the feeding stroke. The stop means comprises a brake structure having an operating connection to the shaft 28 so that a braking pressure is automatically applied to the supply roll upon termination of the feeding stroke. As shown in Fig. 2 the roll supporting arm 31 extending from the side frame 12 carries a brake mechanism 60 adapted to engage a brake drum 61 removably attached to the shaft 32 of the roll 30. Adjustable spring means 62 normally applies a braking pressure on the drum 61. The brake is actuated into the off position in which the roll 30 is free to turn by means of a cam 63 carried by the shaft 28 and a suitable linkage mechanism 64. The contour of the cam 63 is such that the spring 62 is compressed to effect release of the brake at the beginning of the feeding stroke to thus enable the supply roll to start and gain momentum with a minimum of resistance. The cam is preferably so formed that the brake is applied after the roll comes up to speed, thus exerting a continuing tension during feeding of the paper web. The drum 61 is removably attached to the shaft 32 of the supply roll by means of a spline collar 65 which is keyed to the drum for axial movement relative to the drum and shaft 32 and is adapted to engage a corresponding spline provided on one end of the supply roll shaft. The supply roll may be readily inserted or withdrawn by sliding the collar 65 out of engagement with the splined end of the supply roll shaft.

To insure proper and accurate termination of feed roll movement at the end of the feeding stroke to thus avoid an overrun due to inertia the lower feed roll shaft 43 is provided at its right-hand end with a disk 70 having a pair of diametrically opposed notches 71. A rock member 72 provided at its upper end with a roller 73 that is adapted to be received within the peripheral notches 71 is pivotally supported on the side frame 11, as indicated at 74 in Fig. 1 and is provided at its lower end with a roller 75 that rides over the periphery of a disk cam 76 carried by the shaft 28. The contour of the cam 76 is such that the member 72 is rocked to bring the roller 73 into engagement with one of the notches 71 at the termination of the feeding stroke to thus lock the feeding mechanism. The proportioning of the feeding parts is such that each feeding stroke comprises one and one-half revolutions of the feed rolls 34 and 35 and thus one of the notches is carried into proper registering position at the termination of each feeding stroke. The member 72 incorporates a safety device to prevent breakage in case the proper relationship of movements is not maintained. As shown in Fig. 1 the roller 75 is carried by a short arm 77 that is pivoted at 78 to the lower end of the rock member 72 and normally forms an extension thereof. Spring tensioning means 79 maintains the arm 77 in fixed relationship with respect to the rock arm 72 during normal operation of the machine but permits relative movement between these two parts should the roller 73 fail to engage one of the notches 71.

As mentioned above a cut-off knife is provided to shear the supply web into sheets having the required length to form a container body of the desired number of turns of paper material. This knife is indicated generally by the numeral 85 in the plan view of Fig. 3 and comprises a lower stationary blade extending across the entire width of the paper web and an upper movable blade that extends transversely of the machine and is guided at its opposite end within upright guide members 86 carried by the frame members 11 and 12. Knife movement is obtained through the medium of a linkage which is operated by a cam attached to the shaft 28 which controls the operation of the feed rolls 34 and 35. As shown in Fig. 4 the upper knife blade has links 87 pivotally connected to its opposite ends and these links are connected at their lower ends to rock arms 88 that are mounted on a cross shaft 89 that extends through the machine parallel to and in the general vicinity of the driving shaft 28. An arm 90 is rigidly attached to one end of the shaft 89 and terminates at its outer end with a roller 91 adapted to run in the track or groove 92 of a cam plate 93 that is fixed to the shaft 28 and provides the actuating movement for the knife.

Movement of the arms 88 to reciprocate the knife is obtained through rotation of shaft 89 in response to movement of roller 91 in cam groove 92. The contour of the cam track 92 is such that a proper reciprocating motion is afforded for the knife during the dwell period in the operation of the feed rolls 34 and 35. To provide a releasable drive for the knife to prevent damage to the knife and associated structure in case some obstruction to free movement is encountered the arm 88 on the right side of the machine is loosely mounted on the shaft 89 and movement thereof upon rotation of the shaft is obtained through the medium of an auxiliary arm 94 that is attached to the shaft 89 for movement therewith and is provided at its outer end 95 with a releasable connection with the arm 88. Under normal conditions of operation the arm 94 drives the knife arm 88 through this connection but any unusually heavy load will cause the connection to release and permit the driving arm 94 to move independently of the arm 88. A release of this character may also be provided for the arm 88 at the left-hand side of the machine.

The feed rolls 34 and 35 advance the paper web upon a table 100 and a proper positioning of the paper sheet is maintained during the shearing operation through provision of holding means carried by the upper knife and acting upon the table 100. As shown in Fig. 4 this means comprises a presser bar 101 which extends across the operating width of the table and is carried by a plurality of vertically extending rods 103 mounted in a U-shaped bracket 102 attached to the upper knife blade. The rods 103 are axially movable in the bracket and are provided with collars 104 against which coil springs 105 arranged between the collars and the upper leg of the bracket act to urge the rods 103 and presser bar 101 downwardly. The lower leg of the bracket 102 acts as a stop to limit the downward movement of the rods and presser bar and thus provides a spacing between the presser bar and the table when the upper blade is in its upper retracted position. When, however, the upper knife descends on its cutting stroke the presser bar engages the paper web on the table and exerts a holding pressure thereon through the medium of the springs 105.

During the advance of the paper web beneath the knife, and advance of the severed sheets for further processing, the paper is prevented from lifting from the table 100 by provision of a structure which overlies the table 100 and comprises a plurality of spaced transverse bars 110 that have fixed to the under side thereof spaced longitudinal extending rods 111 beneath which the sheared sheets may pass; the rod ends being upturned as indicated at 112.

The machine structure thus far described is generally similar to that shown and described in the copending Patent No. 2,163,318, and the structure of the upper and lower shearing knives for severing the paper web into the desired lengths is preferably of the character there described to provide a very clean shearing cut adapted to receive a coating of sealing material to prevent wicking of the contents of the formed container into the paper wall portions thereof. Reference is made to this copending application for a more detailed description of these several parts.

To facilitate the application of metal end closures in crimped, leakproof relationship with respect to the wall of the container body a means is provided for reducing the thickness of the paper material at the inner and outer seams of the formed container body to provide portions of reduced thickness at the ends of the seams where the end closures are crimped to the body wall, thereby avoiding abrupt changes in the thickness of the body wall at these points. This means is operated by the shaft 28 in proper timed relationship to the feed of the paper web and provides for cutting away or skiving a portion of the untreated or raw side of the paper web at predetermined areas which will lie at opposite ends of the blanks from which the container bodies are wound. Referring to Fig. 4 the web 33 as it unwinds from the roll 30 passes beneath two spaced guide rolls 115 and 116 between which is mounted a shaft 117 that carries a plurality of skiving cutters 118. As shown in Fig. 3A the cutters are removably mounted in adjustable spaced relation on shaft 117. The shaft 117 is so positioned that a space is normally provided between the cutters 118 and the paper web as it passes beneath the guide rollers 115 and 116 so that the cutters do not normally cut into the paper material.

The paper web is raised into contact with the skiving cutters at the proper point in the operating cycle by means of a vertically movable presser plate 119 that extends transversely of the machine beneath the cutters 118 and is adapted to engage the under side of the web and press the upper side thereof against the skiving cutters. The weight of the plate 119 is such that it normally occupies a lowered position in which it rests on transverse guide bars 120. The table is raised to its upper position in which the cutters 118 cut into the paper web by means of a rock cam 121 that operates upon a member 122 that extends downwardly from the plate 119 between the guide bars 120. The member 122 also serves to guide the table 119 during its vertical movement. The cam 121 is mounted upon a rotatable shaft 123 suitably supported on the frame structure and is rocked by means of an arm 124 that is pivotally connected at 125 to a link 126. The link 126 is pivotally connected at 127 to one end of an arm 128 that is pivotally mounted on the machine structure by means of a shaft 129. The arm 128 is provided with a finger 130 that projects into the path of the roller 91 carried by the shearing knife operating arm 90 and is adapted to be engaged by a laterally projecting portion of the roller 91 upon upward movement thereof in the cam track 92. The positioning of the finger 130 is such that as the roller 91 moves upwardly in the inwardly extending portion of the cam track 92 the laterally projecting portion of the roller engages the finger and swings it upwardly about the pivot 129. This causes the arm 128 to rock the cam 121 in such manner as to raise the plate 119 and press the paper web against the skiving cutters 118. The contour of the cam 121 is such that when the plate 119 is raised to its upward position the skiving cutters cut only a predetermined depth into the paper web and only a portion of the total thickness of the paper material is removed. The cutters 118 are rotated by means of a chain 131 that runs over a sprocket 132 carried by the continuously rotating shaft 28 and a sprocket 133 carried by the cutter shaft 117. When a paper material having a greaseproof or other surfacing thereon is used the web is so wound on the jumbo roll that the treated surface of the paper lies on the underside of the web as it is unwound from the jumbo roll by the feed rolls 34—35 and the paper material is skived on its raw or untreated side. The table 119 is lowered at the end of the skiving operation by means of spring 131' that pulls upward on the arm 128 and rocks the cam 121 to the position illustrated when the finger 130 is lowered by roller 91.

As mentioned above the paper web is skived at predetermined areas which will lie at the seams of the formed container body and provide portions of reduced thickness at both ends of the seams where the end closures are crimped to the body wall. Referring to Fig. 5 which illustrates a fragmentary portion of the web 33 as it is advanced in the direction of the arrow by the feed means, the dash lines 135 indicate the lines along which the web is severed into sheets by means of the cut-off knife 85 and the dash lines 136 indicate the lines along which the severed sheets are slit into strips or blanks 137 by slitting means hereinafter described. Each of the blank portions 137 is subsequently wound into the form of a convolute container body with the leading edge of the blank defined by the upper line 135 forming the inner seam and the trailing end of the blank defined by the lower line 135 forming the outer seam. In the preferred embodiment of the invention the positioning and width of the cutters 118 is such that the skived areas 138 are substantially rectangular in the plan view, as shown in Fig. 5, and are centered on the intersection of the lines 135 and 136 to provide cut-away portions at each of the four corners of the blanks 137. Since the skiving operation takes place when the web is at rest the cutters 118 are positioned from the shearing knife 84 by a distance along the path of web feet that is equal to the length of the blanks 137. In the illustrated embodiment of the invention the size of the cutters is such that the skived area extends approximately one-half of an inch to both sides of the lines 135 and approximately one-fourth of an inch to each side of the lines 136, areas of this size having been found to be satisfactory to provide the desired portions of reduced thickness at the ends of the seams where the end closures are applied and sealed on the body wall.

If desired a skiving cutter that extends across the entire width of the paper web may be used in place of a plurality of spaced cutters. In Fig. 6 there is illustrated a fragmentary portion of a web 33' that has been skived in this manner. As shown the skived areas 138' extend across the entire width of the blanks 137' defined by the dash lines 135' and 136'. The areas 138' have a length in the direction of feed as indicated by the arrow that is approximately the same as in the areas 138 of Fig. 5 and these areas are centered on the cut-off lines 135' to provide portions of reduced thickness at both the inner and outer seams of each container body. In either embodiment of the invention a portion of the paper material is cut away at each of the four corners of the blank to provide, when the blank is wound into the form of a convolute container body, portions of reduced thickness at both ends of the seams where the end closures are crimped and sealed on the body wall.

Owing to the natural resiliency of the paper material there is a tendency for the adhesively secured outer lap of the formed container body to snap away from the adjacent portion of the body wall at the completion of the forming operation and prior to the application of a label thereto and to assume a position tangent to the cylindrical container wall. This tendency is particularly marked in a high speed operation of the character herein involved in which the mandrel with the wound container bodies thereon are indexed to another station for further processing of the container bodies. There is likewise a tendency for the adhesively secured inner lap of the formed body to flatten out and pull away from the adjacent wall portion after the bodies are stripped from the mandrel assuming the position of a chord with respect to the cylindrical container wall, thus producing a seepage opening into the wall portion of the body and preventing the ready application of end closures thereon. In order to overcome the springing tendency of the outer and inner laps and provide a container body in which both laps remain in place without the necessity for prolonged ironing during the forming operation or a separate ironing operation, a breaker mechanism is provided which bends a portion of the paper web in such manner as to cause a substantial portion of the leading and trailing ends of the severed blank to tend to curl upon themselves. It is not necessary that this action be so severe as to cause the web to actually curl upon itself, such severe action having a possible deleterious effect upon the impervious character of a greaseproofing coating applied to the sheet; it being sufficient to merely reduce the normal tendency of the web to spring away to such point that it may be held in place by the adhesive. This mechanism is shown in Figs. 4, 7 and 8 of the drawings and comprises an angle bar 140 which extends transversely of the machine and is supported at its ends by angle brackets 141. As shown in Fig. 7 the brackets 141 are pivotally supported on the side frames 11 and 12 by means of bearings 142 and pivot pins 143 which permit rocking of the angle bar about an axis extending transversely of the machine. A transverse rod 144 having a circular cross section of small diameter, in the order of ⅜ to ¾ of an inch for example, extends along the upper edge of the upstanding leg 145 of the angle bar 140 and provides a curved surface of relatively small radius over which the desired portion of the paper web is adapted to be drawn, such operation providing the desired breaking action in the web while avoiding disruption of the impervious character of a greaseproof sheet. The rod 144 is received within an arcuate seat 146 provided along the upper end of the member 145 and is attached to the member 145 at its ends only. The member 145 is provided with a plurality of tapped openings 147 which extend upwardly through the member at spaced intervals along the length thereof and are adapted to receive adjusting screws 148 which extend upwardly through the openings and engage the lower portion of the rod 144. The adjusting screws 148 provide a means for crowning the rod 144 to give it a desired transverse curvature corresponding to any curvature that may occur in the paper web and providing for the uniform bending of the paper web across its entire width. A pair of arms 149 are welded or otherwise attached to the end of the angle member 140 that is distant from the pivot axis and these arms carry a roller 150 which rides on the surface of a disk cam 151 carried by the shaft 28 substantially centrally of the machine. The contour of the cam 151 is such that at the proper point in the operating cycle the rod 144 is moved from a position in which the rod is spaced from the paper web, as illustrated in full lines in Fig. 4, to the dotted line position in Fig. 4 in which the paper web is tensioned between the roller 116 and a guide roller 152 and caused to bend around the curved surface of the rod. As shown, the actuated position of the rod 144 relative to the guide rolls 116 and 152 is such that the breaking action is of a relatively mild nature just sufficient to cause positive sticking of the inner and outer laps by means of the adhesive applied to the paper material comprising the container body. The time during which the rod 144 is actuated to its bending position is so related to the feed of the paper web as to bend or curl a predetermined limited portion of the advancing web which, when the web is severed, will provide bent portions of predetermined limited extent at both the leading and trailing ends of the cut blank. The entire length of the blank may be preformed in this manner, but for cylindrical containers having a diameter of approximately four inches it has been found satisfactory to limit the breaking operation to about one or two inches at the leading end and to about six inches at the trailing end of the blank, thus avoiding any deleterious effect upon the strength of the body wall. Since the paper web is drawn over the breaker and with its coated side adjacent the rod and since the rod is rounded and provides only a relatively mild breaking action the coating on the web is not ruptured nor otherwise injuriously affected.

Figure 9:
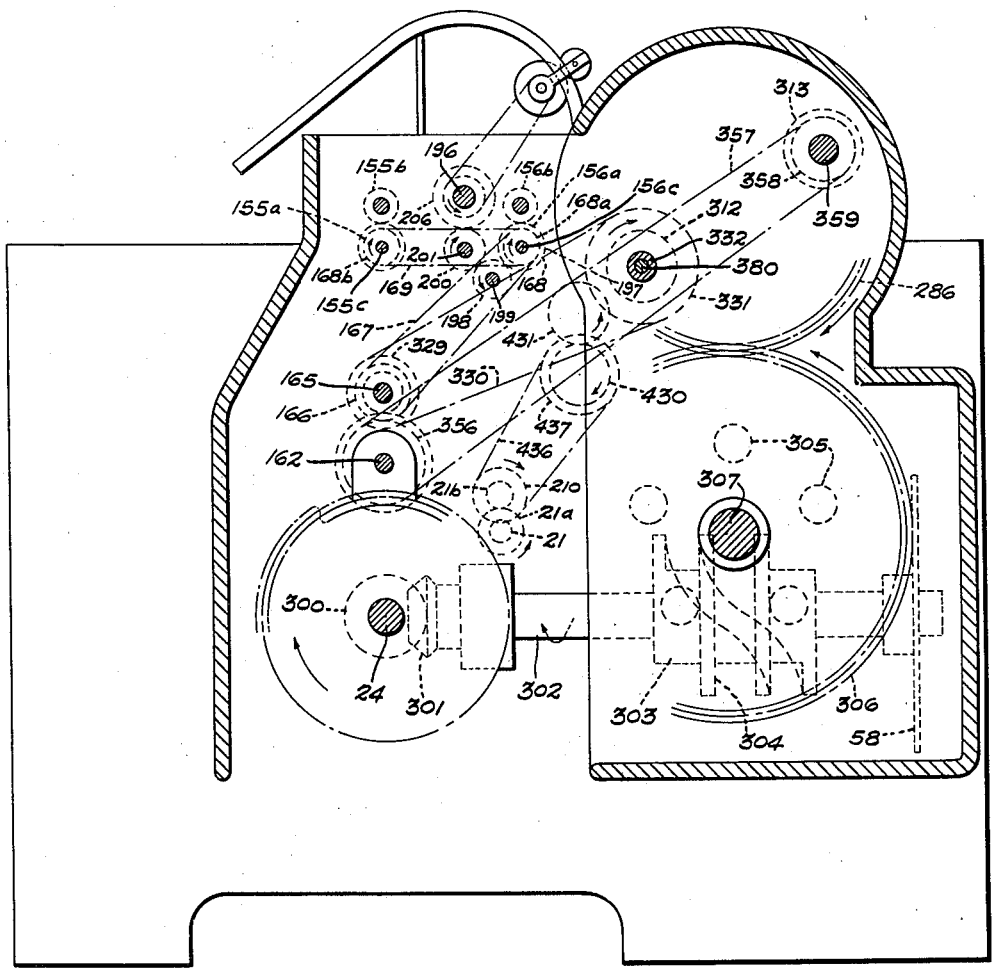
Fig. 9 is a somewhat diagrammatic, fragmentary, elevational view looking towards the right-hand side of the machine and showing the operating connections for several of the machine parts.
Figure 10:
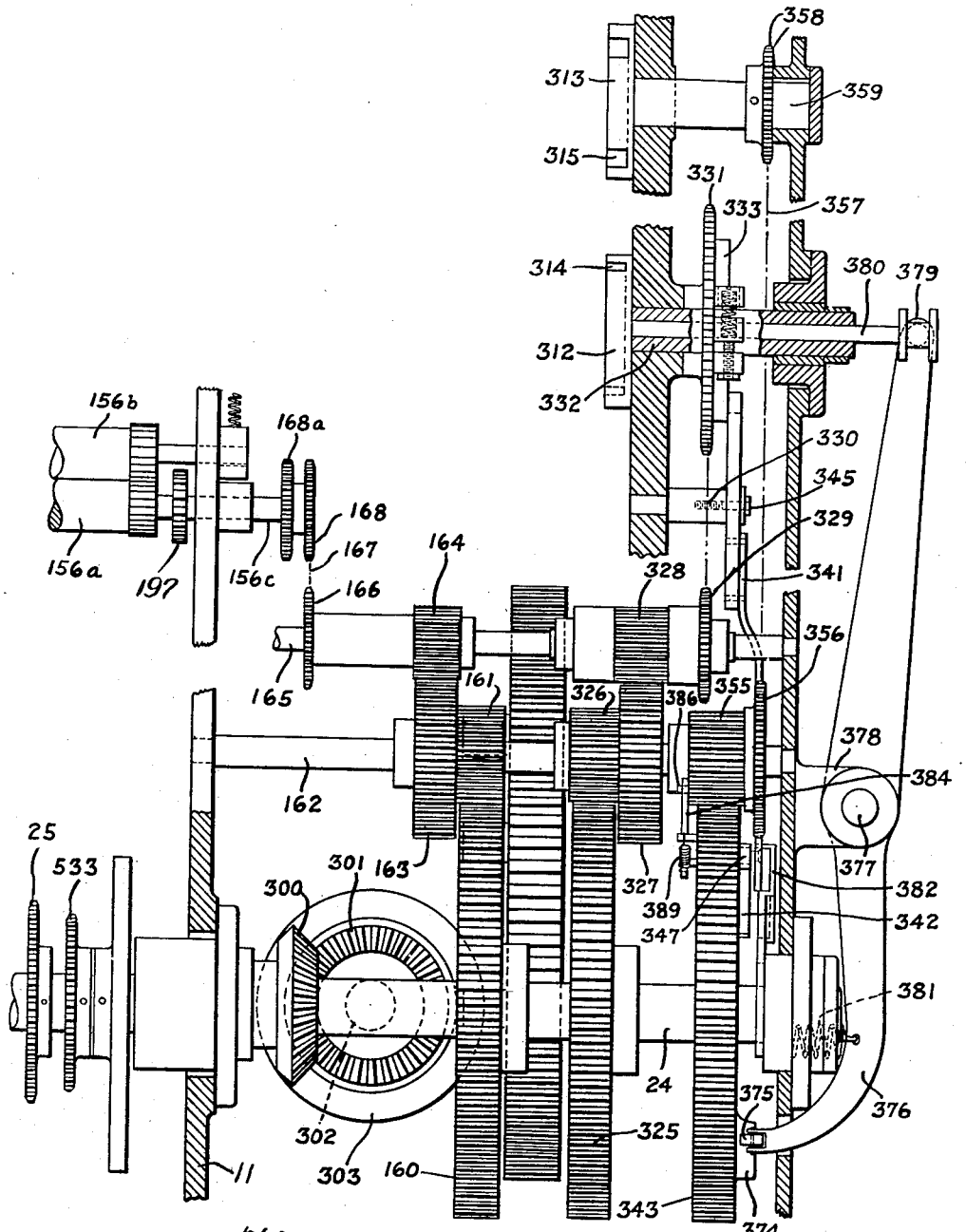
Fig. 10 is a view taken transversely of the machine and illustrates in a diagrammatic manner portions of the driving mechanism.

The sheared sheets, upon leaving the cut-off knife, are advanced in timed relationship to the other operations of the machine by means of two pairs of vertically related feed rolls 155 and 156 which control the feeding and positioning of the paper web from the time it leaves the initial feed rolls 34 and 35 until it comes under the control of a mandrel upon which the strips are formed into cylinders. The feed rolls 155 and 156 are so positioned relative to the table 100 that the advancing edge of the paper web will readily enter the nips thereof. The rolls 155 are so positioned relative to the cut-off knife that the advancing edge of the feeding paper comes under the influence of this feeding roll assembly before this sheet is severed; consequently continuous control is maintained over the paper supply. The feed rolls 155 and 156 have a common drive which is operated intermittently in timed relation to the other portions of the machine structure. Referring to Figs. 9 and 10 the shaft 24 which provides a common drive for the various operating centers of the machine has fixed thereto a spur gear 160 which is of the form known as a mutilated gear having a blank tooth area of such character that an intermittent motion may be obtained therefrom. The gear 160 meshes with the pinion 161 that is freely rotatable on a shaft 162 and has fixed thereto a gear 163. The gear 163 meshes with the pinion 164 that is freely rotatable upon a shaft 165 and which has fixed thereto a sprocket 166. The sprocket has running thereover a chain 167 that also passes over a sprocket 168 attached to one end of the shaft 156c for the lower feed roll 156a of the feed roll pair 156. A second sprocket 168a is also attached to the shaft 156c of the lower feed roll 156a and a chain 169 connects this sprocket to a similar sprocket 168b attached to the shaft 155c of the lower feed roll 155a of the feed roll pair 155. The dwell interval of the gear pair 160—161 is such that motion is imparted to the feeding rolls at a time and for a duration coordinate to the preceding feed and cut-off operation and to the subsequent mandrel operation. As shown in Fig. 10 the lower feed roll 156a is intergeared with the upper feed roll 156b and the pair of feed rolls 155 are similarly intergeared.

The feed rolls 155 advance the paper web past a slitting mechanism which is positioned between the feed rolls 155 and 156 and provides for severing the sheared web into a plurality of laterally related strips or blanks each having a width dimension that corresponds to the height of the container body. Referring to Figs. 4, 11 and 12 the slitting means is shown as comprising a plurality of circular knives 170 which are rotatably mounted between frames 171 at spaced intervals across the machine, the spacing between the knives corresponding to the width of the strips into which it is desired to divide the paper sheet. The frames 171 are connected by spacing members 172, 173 and 174 at the lower and upper ends, and the frames 171 and spacing member 173 are provided on one side of the upper end with a notched projection 175 adapted to seat upon a correspondingly tapered cross member 176 which is attached to the frame of the machine and provides a support for the frames. A lip 177 is pivoted between the frame members at 178 and is adapted to engage the under side of the cross member 176. The frames are securely clamped to the cross member in proper spaced position across the machine by means of screws 179 which extend through a projection 180 at the lower end of the frames and press the hinged lip 177 against the cross member. This manner of support for the slitting knives provides for the ready removal and replacement of the individual knife whenever it becomes worn and thus permits of maintaining all of the knives in proper operating condition to provide the severed strips with sharp, clean-cut and unfrayed edges adapted to readily receive a coating of sealing material and prevent wicking of the container contents at the ends of the container body. The support also provides for readily adjusting the position of the knives on the cross member 176 to provide a desired spacing therebetween.

The knives are resiliently supported within the frame members by a means which permits adjustment of the cutting pressure and which provides for the ready removal of the blades from the frame members. As shown in Figs. 4 and 12 the frame members are provided with a vertically elongated guide slot 181 and the shaft 182 for the knife blade is provided with projections 183 adapted to be received within the slots 181. Elongated wedge members 184 are slidably received within the slots 181 and are provided with forked upper ends provided with a tapered portion 185 adapted to be received within suitable slots provided in the projections 183 of shaft 182. The wedge members 184 are joined together at their lower ends by a cross piece 186. A flat spring 187 provided with a hook 188 at one end is arranged to hook under a pivot pin 189 extending between the frame members and engage the under side of the cross piece 186. A screw 190 having threaded engagement with the bottom of the frame structure provides a tension on the spring 187 to normally urge the projections 183 of the shaft 182 against the top part of the guide slots 181. The shaft 182 is thus resiliently supported in the guide slots of the frame members by means of the spring 187. The circular cutting blade 170 is rotatably mounted on the shaft 182 by means of a roller bearing 191. To remove the cutting knife it is only necessary to loosen the screw 190, disengage the members 184 from the shaft projections 183 and slide the shaft 182 from the inner race of the bearing 191. The cutting blade with bearing attached may then be withdrawn through the slotted opening between the spacing members 173 and 174 at the top portion of the frame structure. The screw 190 provides a means for readily adjusting the tension on the spring 187 to vary the cutting pressure exerted by the rotary knife blades.

The rotary slitting knives 170 extend through suitable slots provided in the table 100 and cooperate with a roller 195 which is carried by a rotatable shaft 196 mounted transversely of the machine. The shaft 196 is operated from the common power source and has a driving connection such that it is rotated concurrently with the feed roll pairs 155 and 156. Referring to Figs. 9, 10 and 11 a gear 197 is shown as attached to the shaft 156c of the lower feed roll 156a interiorly of the machine frame. The gear 197 meshes with an idler gear 198 freely rotatable on stub shaft 199 carried by the frame and the gear 198 meshes with a second idler gear 200 also freely rotatable on a stub shaft 201 carried by the frame. The gear 200 meshes with a gear 206 that is attached to the shaft 196 of the roller 195 and provides for rotating this shaft and the roller upon operation of the feed rolls 155 and 156. The circular cutting blades 170 are pressed into frictional engagement with the roller 195 by means of the tensioning spring 187, and since they are freely rotatable on their shafts 182 are caused to rotate therewith.

As shown in Fig. 11 the roller 195 is provided with arcuate grooves 210 adapted to receive the tapered cutting edges of slitting knives 170. The shape of the knives and grooves is such that as the web 33 is slit the side edges of the strips or blanks 137 are caused to bend upwardly into the grooves 210 as indicated at 211. The severed strips are thus provided with side edges which bend upwardly and the subsequent winding operation on mandrel 212 (Fig. 13) is such that these edges bend outwardly from the mandrel as shown at 213 in Fig. 13 and provide outwardly flaring ends on the wound container body as illustrated at 214 in Fig. 13a. To prevent flattening of the side edges of the strips during advance of the blanks between the feed rolls 156a and 156b of the feed roll pair 156, the upper roll 156b is provided with grooves 215 which receive the bent up edges as illustrated at 216 in Fig. 14. In Figs. 13 and 14 only a fragmentary portion of the mandrel 212 and the lower feed roll 156a is shown. These outwardly bent ends on the formed container body facilitate the application of metal end caps in crimped, sealed relationship without danger of damaging the paper wall of the container body or any surfacing carried thereon.

In Figs. 15, 16 and 17 there is illustrated a modified structure for the slitting knives and also a modified arrangement in which the rotary slitting knives 170' merely slit the paper web into strips of the desired width and the bending of the side edges of the severed strips is accomplished by means of feed roll pair 156' corresponding to the feed rolls 156 in Fig. 4. Referring to these figures the circular cutting knife 170' is shown as being rotatably supported in a substantially V-shaped bracket or frame 220 having laterally projecting portions 221 which are pivotally connected at 222 to a clamping plate 223. The plate 223 has an upper notched projection 224 which seats upon the upper tapered surface of cross member 176' and the plate is securely clamped to the cross member by means of screw 225 which threads through a lower projection 226 and presses a pivoted lip 227 against the under side of cross member 176'. This manner of supporting the plate 223 on the machine is generally similar to that provided for the frames 171 of knives 170 and provides for the easy removal and replacement of individual knives and for the ready adjustment of the positioning of the knives to vary the spacing therebetween. The bracket 220 is provided with upwardly opening notches 228 and bearings 229 adapted to rotatably support the shaft 230 of the slitting knife are normally seated within these notches. The circular knife blade 170' is fixedly secured to the shaft 230 by means of nut 231 which has threaded engagement with the shaft and clamps the blade against a collar 232 carried by the shaft. The collar 232 and a cooperating collar 233 maintain the blade 170' in a fixed position between the arms of the V-shaped bracket 220. The clamping plate is grooved as indicated at 234 to prevent interference with the freely rotatable knife. The knife 170' is adjustably maintained in a proper cutting position relative to the cooperating roller 195' by means of a thumb screw 235 which has threaded engagement with the lower portion of bracket 220 and presses against a bearing member 236 carried by clamping plate 223. The thumb screw 235 provides for swinging the bracket about the pivot 222 to adjust the cutting pressure of the knife. The knife is locked in the adjusted position by a set screw 237 which threads through the bottom of the bracket 220 and engages the thumb screw 235.

The roller 195' comprises a plurality of rings 240, made from steel or the like, which are mounted on the shaft 196' and are clamped between spacing collars 241 carried by the shaft. As shown in Fig. 16 the rings 240 are so spaced by the collars 241 as to correspond in position to the slitting knives 170' with which they cooperate in slitting the paper web into strips of the desired width. The collars 241 are made from a suitable metal such as steel and are so mounted on the shaft 196' as to rotate therewith and cause rotation of the rings clamped therebetween. The shaft 196' is continuously rotated by the gear 206 of Figs. 9 and 11 and causes rotation of the freely rotatable cutting knives 170' by virtue of the cutting pressure existing between the knives and rings 240.

As above stated, in the embodiment of the invention illustrated in Figs. 15 and 17 the knives 170' and cooperating roller 195' merely slit the paper web into strips and the feed rolls 156' which correspond to the rolls 156 in Fig. 4 are utilized to provide the desired upward bend at the side edges of the severed strips. Referring to Figs. 15 and 17 the lower roll 156a' of the feed roll pair 156' is shown as being provided with a ring-like projection or rib 245 and the upper roll 156b' as being provided with a cooperating groove 246. A plurality of these ribs and grooves are spaced along the rolls in positions corresponding to the slits in the paper web, and as the severed strips are advanced between the rolls the side edges are bent upwardly into the grooves 246 by means of the ribs 245 as indicated at 247 in Fig. 17. The side edges of the strips or blanks are thus shaped to provide outwardly flaring ends on the formed container body.

Figure 3:
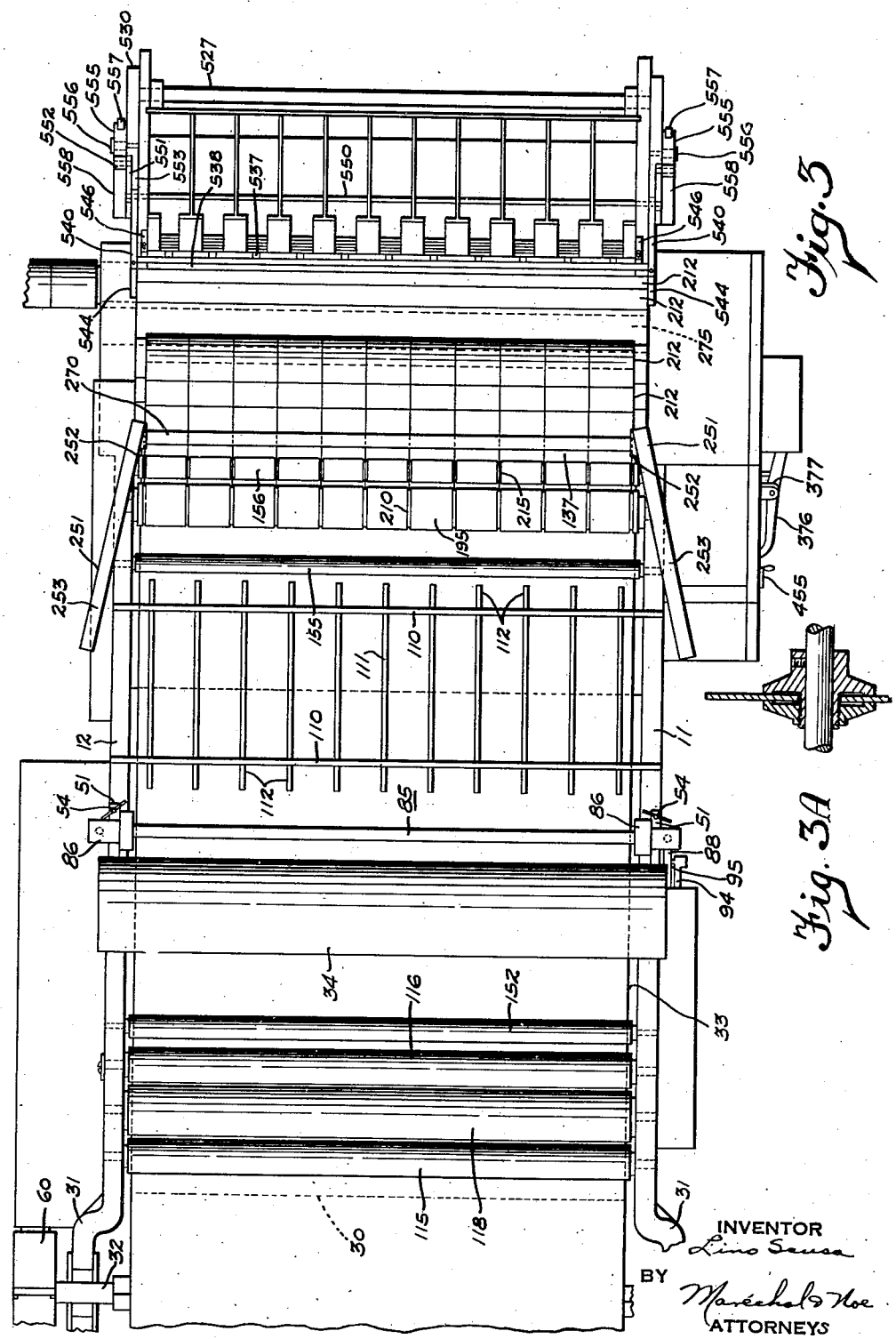
Fig. 3 is a plan view of the machine.

During the slitting operation provision is made for assuring that all of the several blanks including the two outside strips will be of the desired predetermined width and will be provided with sharp, clean-cut, unfrayed side edges readily adapted to receive sealing or coating material and prevent wicking of the container contents. In the slitting arrangement of Fig. 11 the outside edges of the two outside blanks are also bent upwardly at this time to provide outwardly flaring ends on both ends of the two outside container bodies. Referring to Fig. 11 the supply web is shown as having a width something in excess of the accumulated width dimension of the laterally arranged strips 137, and end knives 170a, similar in structure to the knives 170, are provided to sever the two outside strips into the proper width and separate a marginal trim strip 250 at each side of the supply web. These knives cooperate with grooves 210a in the roller 195 to bend the outside edges of the outer strips upwardly as indicated at 211a. The web is usually of such width that but a narrow marginal trim strip 250 is removed from each of the edges. As shown in Fig. 3 the illustrated machine provides for slitting the web into eleven body strips and two narrow trim strips. The width of the web is such that each body strip has a width of 5½ inches.

Provision is also made for conveying the trim strips away from the machine. As more particularly shown in Figs. 3, 4 and 11 a tubular member 251 of rectangular cross section is provided adjacent each side of the machine and terminates at one end 252 with an opening arranged adjacent the feed rolls 156 and in substantial alignment with the severed trim strips 250. The members 251 curve upwardly and over towards the supply roll end of the machine and terminate in substantially straight portions 253 which slope downwardly and outwardly from the sides of the machine and direct the trim strips into suitable receptacles or the like positioned adjacent the machine sides. The tubes 251 are supported on the machine by means of the frame members 254 and 255. A lower feed roll 256 and a smaller upper feed roll 257 are mounted on the member 251 and extend into suitable openings therein to receive the trim strip as it is advanced by the feed rolls 156 and feed it into the straight portion of the tube where it falls by gravity. The feed rolls 256 and 257 are supported by frame members 258 which are secured to opposite sides of the tubular member 251 and rotatably support the lower roll shaft 259 and the upper roll shaft 260. The shaft 260 for the upper roller 257 is vertically slidable in the frame member 258 and a coil spring 260a resiliently urges the upper roller towards the lower one.

The rolls are secured to the shafts and are driven from the continuously rotating shaft 196. As shown in Figs. 4 and 11 a sprocket 261 is formed on the roller 195 adjacent each end and chains 262 run over these sprockets and also over sprockets 263 attached to the lower roll shafts 259. Intermeshing gears 264 and 265 having a diameter substantially the same as the rolls 256 and 257, respectively, are attached to the shafts 259 and 260 and provide a positive drive for the upper roll. The distance between the feed rolls 146 and the trim conveyor feed rolls along the path of the strip is less than the lengths of the sheets cut off by the shearing knife. The positioning of the feed rolls 256 and 257 is thus such that the forward end of a trim strip is engaged therebetween before the trailing end of the strip leaves the feed rolls 156.

The illustrated embodiment of the invention provides for the winding of cylindrical bodies having a diameter of approximately four inches. The arrangement of the machine in this embodiment is such that the formed body comprises three full turns of paper material plus an overlap, and the length of the body blanks is about 39½ inches. The machine parts are so proportioned that the initial cut-off is performed after the web 33 has been engaged by the first feed roll pair 155 and just before the leading edge of the paper web reaches the slitter knives which slit the web into strips.

Referring now in greater detail to the operating cycle of the feed means, the feed roll pair 155 is rotating to receive the web advanced by feed rolls 34 and 35 and advance the leading edge of the web to a point just ahead of the slitter knives. When the web is advanced to this point all feeding stops to permit the cut-off knife to operate. Promptly following knife operation and while initial feed rolls 34 and 35 remain stationary, the feed roll pairs 155 and 156 resume rotation to advance the severed blank past the slitter knives and onto a mandrel adapted to receive the severed strips and wind them into the form of container bodies. Rotation of this mandrel begins at a time properly related to the advance of the strips by the feed roll pairs 155 and 156, and continues to complete the winding of the web blanks into desired container form. At a proper interval of time, after initiation of rotation of feed roll pairs 155 and 156, the initial feed rolls 34 and 35 resume rotation to repeat the operation described. The time interval during which the initial feed rolls remain stationary after the feed roll pairs 155 and 156 have resumed rotation is such as to provide the necessary spacing between the successive blanks. Thus the blank about to be severed travels only one blank length into the nip of feed rolls 155. But the preceding blank travels, in addition to the blank length, through the space between its leading edge when stationary and the mandrel, and further its trailing edge is rotated at least a short distance in wound position upon the mandrel. Additional time is also necessary to provide for indexing of the mandrels as will be described hereinafter. All of the feed rolls have the same peripheral speed.

By making the machine proportions such that when the web has been advanced to the proper point for cut-off and the initial feed has stopped the leading edge will be engaged by the feed roll pair 155 but will terminate short of the slitting station and any adverse effects caused by an unevenly wound jumbo supply roll are avoided. If the supply roll is wound tighter on one side than on the other there is a tendency for the initial feed rolls to cause the paper web to turn somewhat towards the tight side as it is unwound and advanced by these rolls. This tendency, if continued after the operation of slitting the web into strips is begun, may cause the slitters to sever the side edges of the strips along irregular or angularly related lines that will produce irregular ends on the wound bodies. After the web has been severed by the cut-off knife, however, the control of the initial feed rolls is terminated and the feed roll pairs 155 and 156 advanced the web in a straight line without any further tendency for turning. Thus in the described machine in which cut-off takes place before the leading edge of the web reaches the slitter knives the web is advanced in a straight line past the slitters and is severed into body blanks having straight parallel side edges. Any irregularities caused by the web being fed at an angle by the initial feed rolls occur in the turn strips that are cut from each side of the web and discarded thereby providing blanks having side edges that are substantially parallel and normal to the axis of winding.

As above mentioned the feed roll pairs 155 and 156 advance the paper strips to a mandrel upon which the strips are wound and further processed. During movement between the feed rolls 156 and the mandrel the strips are guided over a fixed guide 270 and between plates 271 and 271a, Figs. 4, 31 and 41, that converge towards the winding mandrel and feed the strips directly into suitable grippers carried by the mandrel. The plates 271 and 271a are carried by a pair of arms 272 which are pivotally mounted on the machine at their upper ends 273 and provide for swinging the plates out of the way for the indexing movement of the mandrels.

As shown in Figs. 4 and 41 the guide plates 271 and 271a are urged to the position in which they lie relatively close to the mandrel at the winding station and serve to direct the paper strips directly into the grippers provided on the mandrel by means of a spring 274 which pulls the arms 272 against a stop 274a supported on the machine. The guide plates are swung to a clearance position relative to the mandrel to provide for indexing movement of the mandrel assembly by means of a suitable cam 212a carried by each of the mandrels 212 and positioned to engage the curved lower end at one of the arms 272 upon rotation of the mandrel and swing the arms 272 and guide plates outwardly away from the mandrel. The guide plates are releasably locked in the clearance position by means of a latch 272a that is pivotally mounted on one of the arms 272 at 272b and is adapted to engage a locking lug 272c provided on the machine frame. Release of the latch to permit the spring 274 to return the arms 272 and guide plates 271 and 271a to the initial guiding position in which the arms engage the stop lug 274a and the guide plates again lie relatively close to the mandrel prior to the next winding operation is effected by the indexing movement of the mandrel assembly following each winding operation. As shown the latch 272a is provided with an angularly related arm 272d which, as indicated in Fig. 41, extends downwardly into the path traveled by the cam 212a during indexing movement of the mandrel away from the winding station. The arrangement of parts is such that after the mandrel has been indexed through a distance sufficient to clear the guide plates the cam 212a engages a suitably inclined portion 272e provided on the end of arm 272d and causes the latch to swing upwardly out of engagement with the locking lug 272c. The spring 274 then returns the arms 272 and guide plates to the initial guiding position.

A spring 272f tensioned between the latch 272a and one of the arms 272 pulls the latch downwardly into locking engagement with the lug 272 when the guide plates are cammed into the clearance position. The end of the latch normally rests on the top of locking lug 272c and is adapted to ride over the top of the lug into locking engagement therewith upon swinging of the arms 272 away from the mandrel. The angular positioning of the cam 212a on the mandrel 212 is such that it engages the lower ends of arms 272 and cams the guide plates outwardly away from the mandrel only after the grippers have securely clamped the leading edges of the strips fed thereto. This angular positioning is also such that upon indexing movement of the assembly the cam will engage the depending arm 272d of the latch 272a and effect release of the latch from the locking lug 272c.

From the foregoing description it will be evident that when the paper strips are first fed in the mandrel the arms 272 and guide plates 271 and 271a occupy the position shown in Figs. 4 and 41 in which the arms are pulled against the stop 274a and the guide plates lie relatively close to the mandrel in a position to guide the paper strips directly into the grippers carried by the mandrel. After the paper strips have been securely clamped by the grippers and rotation of the mandrel is initiated the cam 212a engages the lower curved end of one of the arms 272 and swings the guide plates to a clearance position relative to the mandrel in which they are releasably held by the latch 272a. Upon indexing movement of the mandrel assembly and after the mandrel which formerly occupied the winding station has advanced sufficiently far to clear the guide plates the cam 212a engages the depending arm 272d and effects release of the latch. The spring 274 then returns the arms 272 and the guide plates to the position in which the plates serve to feed the next series of paper strips directly into the grippers carried by the next mandrel of the mandrel assembly.

The machine has a plurality of mandrels 212 that are arranged in an assembly such that they may be successively advanced to a plurality of different dwell positions including a winding station, a label applying station and a stripping station at which the container bodies are removed. In general, the mandrel assembly comprises a central shaft 275 around which the mandrels are supported in uniform angular spacing. Each of the mandrels is supported for rotation on its own axis and the assembly as a whole is rotatable about the central shaft 275 as an axis to index the mandrels to the various dwell positions. There are as many dwell positions as there are mandrels in order that each mandrel may be successively advanced to each of the above mentioned operating stations, and consequently a mandrel stands at each dwell position upon completion of each indexing operation. In the illustrated machine there are four mandrels and four dwell positions, the dwell positions being indicated generally by the numerals 276, 277, 278 and 279 in Fig. 4.

By providing a greater number of mandrels than there are operating stations the arc through which each mandrel turns during the indexing operation is decreased, thereby decreasing the time required for indexing and providing a greater time for setting of the adhesive which secures the bodies in wound form. If desired, a larger number of mandrels than the four illustrated may be used.

Referring now to the mandrel assembly in greater detail, and more particularly to Figs. 2 and 18, the end of the shaft 275 adjacent the right-hand side of the machine is provided with a portion 280 of reduced diameter which is rotatably supported in a bearing (not shown) suitably mounted in the frame structure of the machine, and the opposite end of the shaft is rotatably supported by means of a spider-shaped member 281 which is fixed to the shaft and has equally spaced segmental arms 282 provided with circular rim portions that turn within a member 283 supported from the frame member 12 and having a circular opening therein defined by the rim 284 which serves as a bearing for the curved segments 282 of the member 281. The segmental arms 282 provide equally spaced notches 285 adapted to receive and support one end of the mandrels 212 as will be hereinafter described. Fixed to the shaft 275 adjacent the right-hand end of the machine is a large spur gear 286 that serves as a portion of the mandrel indexing mechanism and additionally serves as a support for the other end of the mandrels. The ends of the mandrels are rotatably carried in the gear 286 by suitable self-aligning ball bearings which are equally spaced around the shaft 275 in axial alignment with the notches 285 and are suitably constructed to provide for slight angular movement of the mandrel axis during the stripping operation as will be brought out below.

Figure 26:
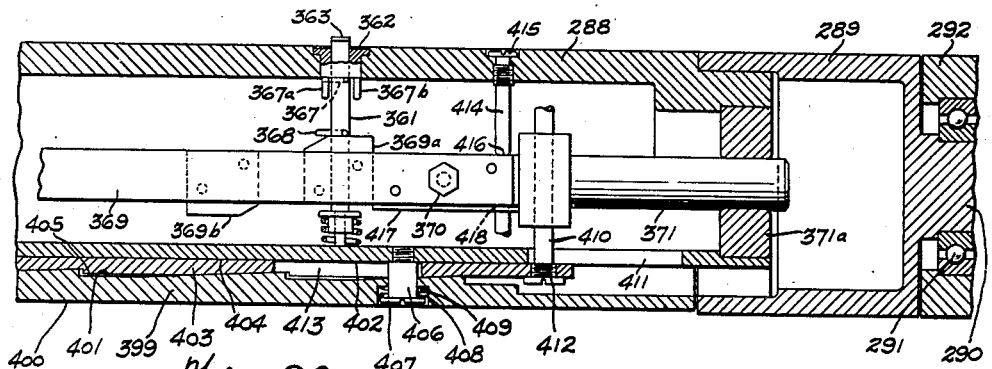
Fig. 26 is a sectional view taken on the line 26—26 of Fig. 25.

As shown in Fig. 18 the mandrel comprises a portion 287 of reduced diameter which is received within the bearings carried by gear 286 and a main body portion 288 which receives the paper strips and extends across the full operating width of the machine. In the present instance the length of the body portion 288 is such that eleven container bodies may be wound simultaneously in end-to-end relationship. As best shown in Fig. 26 the body portion 288 of the mandrel terminates at the left-hand side of the machine in a fitting 289 having a tubular portion which telescopically engages the end of the mandrel portion 288 and having an axially extending end part 290 upon which is maintained anti-friction bearing 291. The bearing 291 has fixed to its outer race a collar or roller 292 having a diameter substantially the same as that of the main body portion of the mandrel and having a face portion of material axial length. This bearing, of which one is provided for each mandrel, is received within the notches 285 of the spider-shaped member 281 and functions as a part of the mandrel supporting structure. The spider-shaped member 281 is provided with a pair of anti-friction bearings 293 adjacent each of the notches 285 which bear against the collar 292 and maintain the collar in engagement with the rim face 284 of the member 283 to normally support the mandrels with their axes parallel to the axis of the shaft 275. A support is thus provided which permits free rotation of the mandrels at the various operating stations and which permits free rolling of the collar 292 on the surface 284 of member 283 during indexing of the mandrel assembly. The parallel relationship between the axes of the mandrels and the shaft 275 is maintained throughout the rotation of the mandrel assembly except at the stripping station 279 where the construction is such that the mandrel occupying this position is dropped at the left-hand end of the machine to a clearance position with respect to the supporting structure to permit withdrawal of the container bodies. This operation obtains by providing at the stripping station a slot or gap 294 in the ring-like supporting member 283 which incorporates the rim portion 284 that functions as a bearing surface for the mandrel rollers 292 and serves as a part of the structure that maintains the axial relationship of the mandrels. Since the stripping station is positioned at a lower part of the supporting member 283 no support exists at the point of gap and consequently the mandrel is free to fall to a clearance position relative to the bearings 293.

To provide a clearance entirely around the mandrel at the left-hand side of the machine in order that the container bodies may be freely stripped from the mandrel; a means is provided to limit the fall of the mandrels at the gap 294. Referring to Figs. 18 and 19 a spider-shaped member 295 is carried by the shaft 275 in axially spaced relationship to the spur gear 286 and is provided with radially projecting arms 296 having openings 297 adapted to receive the reduced portion 287 of the mandrels. The diameter of the passages 297 is such as to normally provide an annular clearance around the portions 287 of the mandrel. When the mandrel is rotated to the stripping station and the end thereof adjacent the left-hand side of the machine falls into the gap 294, this clearance permits a limited angular movement of the axis of the mandrel relative to the shaft 275. The fall of the ends of the mandrels at the stripping station is thus limited by the clearance between the passage 297 and the mandrel portion 287, and this clearance is such that the end of the mandrel moves to a position providing a clearance gap entirely around the mandrel with respect to the supporting structure at the left side of the machine. Suitable means are provided in the arms 296 adjacent the passages 297 to resiliently catch the mandrel when it falls at the stripping station.

The angular drop of the mandrel is thus of limited extent and the arrangement of the machine parts is such that no additional structure is required for the operation. As the mandrel approaches the stripping station the roller 292 passes from engagement with its supporting rim 294. As the indexing movement is resumed at the end of the stripping dwell the rollers cam back into the cam track 284 which again brings the mandrel into engagement with the roller bearings 293 so that the mandrel thus resumes its axial alignment.

Indexing movement of the mandrel assembly incorporates an intermittently operating drive having connection to the common power source. As shown in Figs. 9, 10 and 18 the continuously rotating shaft 24 has fixed thereon a beveled gear 300 which meshes with a gear 301 that is fixed to a shaft 302 that extends transversely to the shaft 24 and in a horizontal direction to a point beneath the mandrel assembly. This shaft 302 has fixed thereon a barrel cam 303 which incorporates a suitable guideway 304 that serves to engage and advance lugs 305 having a uniform angular spacing upon a spur gear 306 that is rotatably mounted on a stud shaft 307, fixed to the main frame. The gear 306 has meshing engagement with the mandrel gear 286 and imparts indexing movement to the mandrel assembly as it is advanced by movement of the barrel cam. The cam 303 rotates continuously and the angular positioning and shape of the cam track 304 is such that the mandrel assembly is caused to alternately index and dwell in timed relation to the movement and travel of the other portions of the machine. In the machine illustrated the cam engaging lugs 305 are five in number and the size relationship of the gears 286 and 306 is such that angular travel of the gear 306 by the amount of spacing of two adjacent lugs 305 will advance the mandrel assembly the proper indexing travel.

To provide for rotation of the mandrels at the winding and label applying stations and for the proper angular positioning of each of the several mandrels at each dwell position, the mandrels are each provided with a crank arm that is adapted to be engaged by a rotatable head at each station where rotation is desired and to be guided within a slotted track during the indexing travel. In this manner continuous control is maintained over the mandrels throughout the operating cycle. As shown in Figs. 18 and 20 the ends of the mandrels that project through the gears 286 have each affixed thereto a crank arm 310 which carries at the outer end a driving lug 311. The driving heads with which the crank arm lugs engage at the winding and label applying stations are shown in Figs. 10 and 21 and comprise rotatably mounted members 312 and 313 that are carried by the machine frame structure in positions axially related to the dwell positions 276 and 278 of the mandrels. The driving head 312 which engages the driving lug 311 of the mandrels at the dwell station 276 provides for rotating the mandrel at the winding station and the head 313 which engages the lugs 311 at the dwell station 278 provides for rotating the mandrels at the label applying station.

As shown in Figs. 10 and 21 the winding heads 312 and 313 are provided with lug receiving slots 314 and 315 respectively that are positioned to cooperate in the dwell position of the driving heads with the slotted guide track 316 that extends therebetween; the arrangement being such that the mandrel crank arms are always under the influence of one or the other through engagement of the lugs therewith and consequently are always maintained in proper operating relationship. The slot 314 in the driving head 312 at the winding station 276 is arcuate in shape and concentric to the shaft 275 about which the mandrel assembly rotates and forms a continuation of the portion 317 of the slotted guide track 316 which extends from the label applying station 278 to the winding station 276 and which is also arcuate and concentric with the shaft 275. When stationary at the winding station the mandrel at that position stands so that the drive lug 311 follows or stands behind the mandrel center in the direction of advance of the mandrels which is indicated by arrows in Figs. 20, 21 and 22. The rotational movement of the winding driving head is four full turns. Consequently at the termination of the winding movement the crank arm occupies the same position as before this movement so that upon being indexed after the winding operation the driving lug 311 continues to be in the trailing position illustrated in Figs. 20 and 22.

The portion 318 of the slotted guide track 316 which extends from the winding station 276 to the label applying station 278 is so shaped as to provide a predetermined angular indexing of the mandrel about its axis during movement to the dwell station 277 and the label applying station 278. Referring to Figs. 22 and 23 the letters A and B designate the inner and outer seams respectively of the wound container body and in Fig. 22 show the angular position of these seams relative to the mandrel driving lug 311 at the completion of the winding operation at the winding station 276. As indicated by the arrow the driving head 312 at the winding station 276 is rotated clockwise as viewed in Fig. 22 and since the length of the paper strip is sufficient to provide three full turns plus an overlap as illustrated in Fig. 23 the leading edge of the strip which forms the inner seam A lies to the right and in advance of the trailing edge which forms the outer seam B.

As shown in Figs. 21 and 22 the track portion 318 comprises two straight portions joined together by a curved portion, and the parts are so proportioned that when the mandrel occupies the dwell position 277 the lug 311 will be rotated to the position shown in Figs. 20 and 22 and the outer seam B of the container body will be indexed to a position in which it lies on a radial line passing through the center of the shaft 275 and the mandrel and on the portion of the mandrel circumference most distant from the shaft 275 as indicated at B' in Fig. 22. A circular rod 319 or the like having its center on the radial line passing through the center of the shaft 275 and the mandrel and extending transversely of the machine at the dwell station 277 is adapted to press against the container body at B' and hold the trailing end of the paper strip tightly against the underlying paper layer. The rod 319 is supported on the frame structure by suitable means (not shown) which maintains a clearance between the rod and mandrel sufficient to permit passage of the mandrel and yet cause the rod to press firmly against the container body on the mandrel. The supporting means for the rod may incorporate spring means adapted to resiliently press the rod against the container body. The formed container is thus maintained in tightly wound condition around the container body while the adhesive securing the body in wound form is given an opportunity to set somewhat during the time that the mandrel remains at the position 277.

The arrangement of the slot 315 in the driving head 313 at the label applying station 278 is such as to cooperate with the track portion 318 to cause an additional angular indexing of the mandrel about its axis during movement from the dwell station 277 to the label applying station 278. As shown in Figs. 21 and 22 the slot 315 extends straight across the head 313 in offset relationship to the center of the head and joins the slotted portions 317 and 318 of the guide track in the dwell position of the head. The parts are so proportioned that when the mandrel occupies the label applying position 278 the lug 311 will be rotated to the position shown in Figs. 20 and 22 and the outer seam B of the container body will be indexed to the point B'' in Fig. 22. The letter C in Figs. 22 and 23 indicates the point at which the leading edge of the label 320 is applied to the container body at the station 278. As will be hereinafter more fully described the driving head 313 rotates the mandrel to withdraw the label from a stack and wrap it around the container body to which it is secured by adhesive which has been previously applied to the exterior surface of the body. As indicated by the arrow in Figs. 21 and 22 the driving head 313 at the label applying station is rotated in a counterclockwise direction as viewed in Fig. 22, and accordingly the outer seam B which lies at the point of B'' in Fig. 22 will be covered by the label after only a slight rotation of the mandrel. The trailing end of the paper strip forming the container body is thus covered by the label during the initial application thereof and the adhesively secured label prevents the outer lap from springing away from the body wall very soon after the label application has begun. As shown in Fig. 23 the label has a length just sufficient to wrap around the container body and form a butt lap at the point C. It has been found that if the distance between the points B" and C in Fig. 22 is such that approximately ⅞ of an inch of label is adhesively applied to the container body between the points C and B in Fig. 23 the label will serve to positively maintain the container body in a tightly wound condition and the crease caused by the outer seam of the container body will fall at a desired point on the label relative to the printed matter thereon.

The winding head 313 of the label station is rotated through two or more complete revolutions so that at the end of the label applying operation the crank 310 again occupies the position shown in Figs. 20 and 22 and the driving lug 311 is adapted to again trail the center of the mandrel during the next indexing movement of the mandrel assembly. During the indexing movement to the stripping station 279 and from the stripping station to the winding station 276 the driving lug 311 is guided within the arcuate portion 317 of the trackway 316 and the lug continues to trail the center of the mandrel so that when the mandrel reaches the winding station 276 the crank 310 again occupies the position illustrated in Figs. 20 and 22 and the mandrel is adapted to repeat the above described cycle of operations. Since the angular position of the mandrels is continuously under the control of the trackway 316 and the slots 314 and 315 the inner seams A of the container bodies will always have a predetermined angular positioning at the stripping station 279. This permits the ready application of a narrow band of sealing material to the inner seams of the container bodies as the bodies are stripped from the mandrel.

Rotational movement of the winding heads 312 and 313 is obtained through an intermittent drive connected to the common power source of the machine. Referring to Figs. 9 and 10 the drive for the driving head 312 at the winding station 276 comprises a mutilated gear 325 which is fixedly mounted on the constantly rotating shaft 24 and meshes with a pinion 326 freely rotatable on the shaft 162 and having fixed thereto a gear 327. The gear pair 325—326 is arranged similarly to the gear pair 160—161 in that a blank tooth area is afforded which limits rotative movement of the driven part to a desired interval in the cycle of operation. The gear 327 meshes with a pinion 328 freely rotatable on the shaft 165 and having fixed thereto a sprocket 329 over which runs a chain 330 that engages a sprocket 331 that is mounted on a hollow shaft 332 which carries the winding head 312. As shown, the hollow shaft 332 is rotatably mounted within axially spaced bearings which are provided in the frame structure and support the winding head 312 in axial alignment with the mandrel at the winding station 276.

The sprocket 331 is free to rotate on the hollow shaft 332 and is resiliently connected to the shaft by a means which permits rotational movement of the sprocket relative to the shaft and serves to positively index the mandrels to a proper angular positioning at the winding station and to take up any slack in the leading end of the paper strips that may be caused by failure of the feed rolls to supply the web to the winding mandrel at exactly the proper time and rate. As shown in Figs. 10 and 24, a collar-like member 333 provided with a flat side face 334 is fixedly attached to the shaft 332 adjacent one side of the sprocket 331. A pair of spaced lugs 335 and 336 extend outwardly from the flat face 334 of the driving collar 333 and a lug 337 carried by one face of the sprocket 331 extends outwardly from the sprocket into the space provided between the lugs 335 and 336. A spiral spring 338 is mounted between the driving lug 337 and the lug 335 and provides a resilient drive between the sprocket 331 and the driving collar 333. The spring 338 is mounted within suitable recesses provided within the lugs 335 and 337 and a plug 339 having threaded engagement with the lug 335 provides a means for adjusting the tension of the spring.

A laterally projecting stop pin 340 is carried by the driving member 333 in a position to be engaged by the upper end of a stop lever 341 that is actuated by means of a cam 342 carried on the outside face of a gear 343 fixedly mounted on the continuously rotating shaft 24. The stop lever 341 is supported at its lower end by the shaft 24 and for this purpose is provided with an elongated slot 344 which receives the shaft 24 and permits longitudinal movement of the lever. A headed pin 345 mounted on the frame structure of the machine and received within an elongated slot 346 provided in the lever 341 supports the lever adjacent its upper end. The cam 342 is adapted to engage a rotatable follower 347 carried by the lever 341 and raise the lever to the stop position illustrated in Fig. 24 where the upper end of the lever is adapted to engage the pin 340 and prevent rotation of the driving collar 333. As shown, the cam 342 is provided with a leading upwardly inclined face 348, a top face 349 which maintains the lever 341 in the stop position and a downwardly inclined lowering face 350. The shape and position of the cam 342 is such that just prior to the completion of the indexing movement of the mandrel to the winding station 276 and just prior to rotation of the head 312 at that station the cam portion 348 has raised the stop lever 341 to the stop position illustrated where it is adapted to engage the stop pin 340. The position of the teeth on the mutilated gear 325 is such that rotation of the sprocket 331 begins while the follower 347 of the stop lever is still riding on the top face 349 of the cam. This causes the pin to press firmly against the stop lever to positively index the mandrel to its proper position and also causes compression of the spring 338. Before the driving lug 337 on the sprocket engages the lug 335 on the driving collar 333 the follower 347 reaches the downwardly inclined portion 350 of the cam and the stop lever begins to release the stop pin. The upper end of the stop lever which engages the stop pin 340 is provided with a relatively wide face 351 which acts as a cam surface and releases the pin only gradually as the follower 347 travels downwardly on the cam face 350, thus controlling the release of the pin and avoiding any snap action due to the compression of the spring 338. The arrangement of parts is such that the sprocket rotates only a relatively few degrees before rotation of the head begins. When the cam face 351 of the stop lever has fully released the pin 340 so that the head is free to move, the spring 338 is then free to expand and advance the mandrel angularly to take up any slack that may be present in the paper strips fed to the mandrel. Any slack which might be caused by variation in the angular positioning of the gripping means on the mandrel at the winding station is thus positively avoided by the indexing stop mechanism and that which might result from a too rapid or inaccurately timed feed relative to the initial rotation of the mandrel is taken up by the flexible connection between the sprocket and driving collar 333. In this manner any tendency of the paper strips to wind loosely and bulge or to become misaligned and wind in a spiral manner because of the slack in the leading portion of the paper strips is avoided. A bolt 352 or the like threaded through the lug 336 of the driving collar 333 serves as an adjustable backstop for the driving lug 337 and provides for accurately positioning the slot 314 of the driving head 312 in alignment with the slotted guideway 316 in the dwell position of the head 312.

As shown in Figs. 9 and 10, the driving head 313 at the label applying station 278 is driven from the gear 343 which is attached to the shaft 24 and carries the cam member 342. The gear 343 meshes with a pinion 355 freely rotatable on the shaft 162, and like the gears 160 and 325 is of the mutilated type providing a blank area which limits rotative movement of the driven gear 355 to a desired portion of the operating cycle. A sprocket 356 is fixed to the pinion 355 for rotation therewith and a chain 357 connects the sprocket 356 with a sprocket 358 which is fixedly mounted on a shaft 359 that carries the driving head 313 at the label applying station. Suitable bearings are provided in the frame structure to rotatably support the shaft 359 in axial alignment with the mandrel at the station 278.

To prevent shock on the gear teeth when the tooth portion of the mutilated gear 343 first engages the pinion 355 during each revolution of the mutilated gear a cushioning means is provided which serves to initiate rotation of the pinion prior to the engagement of the first tooth on the mutilated gear with a cooperating tooth on the pinion. Referring to Figs. 10 and 24 the mutilated gear 343 is shown as being provided with an auxiliary tooth 384 that is pivotally mounted on the gear at 385 and is adapted to engage a pin 386 carried by the pinion 355. As shown the tooth 384 and pin 386 are so positioned that the tooth engages the pin and initiates rotation of the pinion slightly ahead of the time that the first tooth 387 on the mutilated gear engages a cooperating tooth 388 on the pinion. In Fig. 24 the pinion 355 and auxiliary tooth 384 are diagrammatically illustrated and only the first tooth on the mutilated gear 343 and a single cooperating tooth on the pinion 355 are shown, it being understood that the gear 343 has a blank portion in which there are no teeth in advance of the tooth 387. The auxiliary tooth 384 is resiliently maintained in a normal extended position where it will engage the pin 386 upon rotation of the gear 343 by means of a spring 389 that is tensioned between an angularly related arm on the auxiliary tooth and a pin 389a supported on the gear. The spring 389 thus serves to cushion and absorb the shock when the auxiliary tooth first engages the pin on the pinion to initiate rotation thereof. A similar arrangement may be provided on the other mutilated gears 160 and 325.

As mentioned above each mandrel incorporates gripping means whereby the advancing paper strips are engaged at the winding station. The paper gripping means (Figs. 25 to 30) comprises a plurality of gripper members that are spaced along the mandrel portion 288 according to the paper strip spacing and are so positioned that each paper strip is securely held. The gripper members extend transversely of the mandrels and are associated with an operating mechanism of such character that the grippers are caused to move axially and to additionally have some rotative movement to provide for gripping the advancing paper strips at the winding station and for releasing the formed container bodies at the stripping station.

Figures 25, 27:
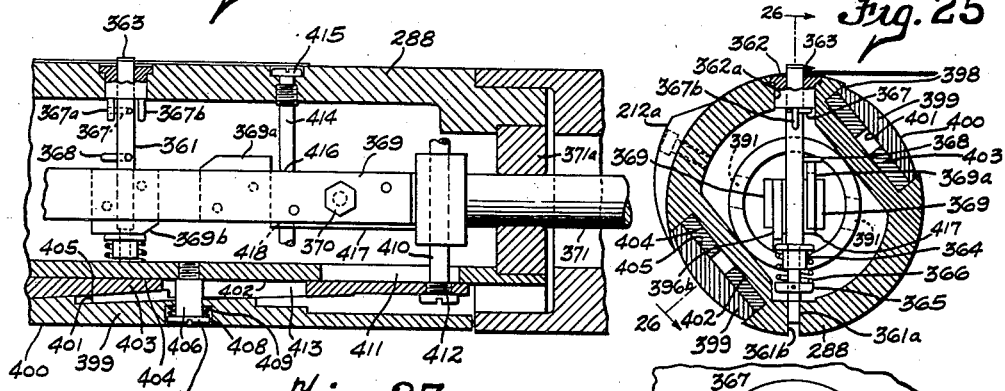
Fig. 25 is a sectional view taken transversely of the mandrel to illustrate the gripping and expanding mechanism.
Fig. 27 is a sectional view taken similarly to Fig. 26 but illustrating the parts in a different position.

As best shown in Fig. 25 each of the gripper members comprises a rod 361 that is slidably and rotatably received within a flanged collar-like plug 362 and is provided at one end with a laterally extending, thin, metallic finger 363 adapted to overlie the leading end of a paper strip and clamp it against the mandrel. The other end of the rod 361 is provided with a portion 361a of reduced diameter upon which a flanged collar 364 is mounted for sliding movement between the shoulder formed on the rod by the change in diameter and a second collar 365 pinned to the rod at a predetermined distance from its end. The slidable collar 364 is normally urged against the collar formed on the rod by means of a coil spring 366 which is mounted on the rod and is compressed between the collars 364 and 365. A laterally extending stop pin 367 is mounted in a suitable hole drilled in the rod 361 adjacent the under side of plug 362 and serves to limit the upward axial movement of the rod relative to the collar-like plug. A pair of stop pins 367a and 367b extend downwardly from the under side of the plug 362 and cooperate with the pin 367 to also limit rotational movement of the rod to an angle of approximately 90° as will be evident from Fig. 29. A laterally extending operating pin 368 is also mounted on the rod 361 at a predetermined distance from its ends and at a predetermined angular positioning relative to the laterally extending finger 363.

Figure 30:
Fig. 30 is a fragmentary sectional view taken on the line 30—30 in Fig. 29 and showing a detent means for releasably locking the gripper in a predetermined positioning relative to the mandrel.

Each gripper further incorporates a detent means for releasably holding the rod 361 and finger 363 in a predetermined raised position relative to the plug collar 362. As shown in Fig. 30 the upper portion of the rod 361 that is slidably received within the plug collar 362 is provided with a transverse opening 361c within which a spring pressed ball 361d is mounted. The plug collar 362 is provided with a cooperating opening 362b adapted to partially receive the ball therein to releasably lock the rod to the collar. The positioning of the cooperating detent parts is such that they are engaged as shown in Fig. 30 when the stop pin 367 occupies a position in which it bears against the cooperating stop pin 367a and has been raised into engagement with the under side of the plug collar 362. The depth of the collar 362 is also such that the ball 361d and the spring 361e are confined within the bore of the collar throughout the limited axial movement of the rod 361.

The gripper member as thus constructed is inserted through an opening 362a provided in the wall of the mandrel and having a counterbored seat adapted to receive and support the flanged plug collar 362 therein. The rod 361 extends entirely across the hollow interior of the mandrel with the end portion 361a slidably received within an opening 361b provided in the mandrel opposite the opening 362a. The length of the rod and the position of the lower fixed collar 365 is such that with the finger 363 lowered into engagement with the upper face of plug 362 the collar 365 is spaced from the inner surface of the mandrel and the rod 361 terminates interiorly of the outer mandrel surface. The gripper member is maintained in a proper assembled positioning on the mandrel by means of a countersunk screw 362c which threads into the mandrel and overlies a suitably countersunk portion of the flanged plug 362. This positioning is such that with the rods 361 rotated in a counterclockwise direction to a position in which the stop pins 367 engage the stop pins 367a as illustrated in Fig. 29 the fingers 363 will extend transversely of the mandrel in the direction of the approaching paper strips so that the strips will be received therebeneath.

The control mechanism referred to generally above is such that the fingers 363 may be moved outwardly to a clearance position with respect to the mandrel face in which position the fingers stand as described above. The rods and attached fingers move inwardly with respect to the mandrel to a clamping engagement with the paper strips and, at the proper time in the mandrel cycle, may move angularly to a clearance position with respect to the gripping position, wherein the overlying portion of the fingers are released from engagement with the paper. The movement of the grippers in each mandrel is controlled by a pair of bars 369 which extend axially of the mandrel on opposite sides of the rods 361 and are connected together at their ends as indicated at 370, Figs. 26–28, for travel in unison. A stub shaft 371 attached to each of the connected ends of the bars 369 is slidably received within suitable bearings 371a positioned adjacent each end of the mandrel portion 288 and provides for supporting the bars for sliding movement axially of the mandrel. Each of the bars 369 carries operating cams adjacent each gripper position, the cams mounted on the right hand bar as seen in Fig. 25 being designated as 369a and those on the left hand bar as 369b. As shown in Figs. 26 to 28 the pair of cams 369a and 369b positioned adjacent each gripper rod 361 are axially spaced apart and are so positioned as to engage the operating pin 368 and the slidable collar 364, respectively, as the bars are moved axially in accordance with the indexed advance of the mandrel assembly.

Figures 28, 29:
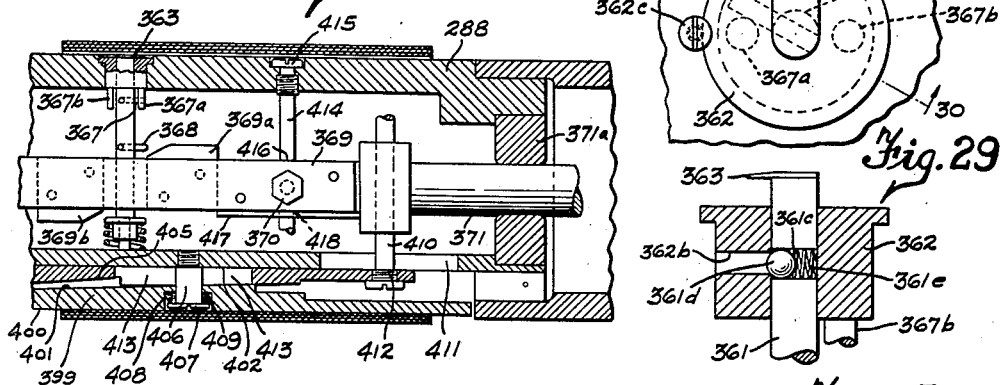
Fig. 28 is also a view taken similarly to Fig. 26 but showing the parts in a still different position.
Fig. 29 is an enlarged fragmentary plan view showing the positioning of the gripper on the mandrel.

The operating sequence of the gripper mechanism is such that as each mandrel approaches the winding station the control bars 369 are moved to the left as viewed in Figs. 26 to 28 to cause the cams 369a to engage the operating pins 368. First interengagement between the cams and operating pins causes counterclockwise rotation of the rods 361 to the position in which the stop pins 367 engage the cooperating stop pins 367a and the fingers 363 extend transversely of the mandrel as shown in Figs. 25, 26 and 29. Further movement of the control members towards the left causes the operating pins 368 to ride upwardly on the inclined portions of the cams 369a, thus raising the rods 361 and moving the fingers 363 to a clearance position with respect to the mandrel. Movement of the control members towards the left continues until the operating pins 368 ride on the tops of the cams 369a as shown in Fig. 26. The lift of the cams 369a is such that when the operating pins 368 reach the top of the cams and movement of the control member towards the left terminates the rods 361 will have been raised sufficiently to cause the balls 361d to snap into the cooperating openings 362b and lift the rods to their upper limit of travel. Each mandrel thus enters the winding station with the control bars 369 moved to the left hand extreme of travel and with the gripping fingers 363 lifted to a clearance position and extending transversely thereof as illustrated in Figs. 25 and 26.

As the advancing edges of the paper strips approach engagement with the grippers the winding mandrel is started to rotate through the driving mechanism described above and, with initial rotation, the gripper controlling bars 369 are moved axially to the other extreme of travel (Fig. 27) wherein the cams 369b engage the slidable collars 364 and cause the collars to be depressed. Downward movement of the collars 364 is transmitted to rods 361 through the springs 366 and fixed collars 365 and causes the fingers 363 to move downwardly into clamping engagement with the leading edges of the paper strips. With the cams 369b pressing down on the collars 364 the force transmitted through the springs 366 causes the fingers to securely clamp the paper strips against the mandrel, irrespective of variations in the thickness of the paper material. During movement of the control bars from the position of Fig. 26 to the position of Fig. 27 the detent means incorporated in each of the grippers maintain the rods 361 in the raised position with the fingers 363 extending transversely of the mandrel to receive the paper strips therebeneath. During movement of the rods 361 to the clamping position the fingers remain in the overlying relationship with respect to the paper strips as indicated by the positioning in Fig. 27.

Movement of the control bars 369 to the clamping position of Fig. 27 obtains through the medium of a cam operated device which is actuated from shaft 24. As shown in Fig. 10, the shaft 24 has fixed thereto the gear 343 which carries upon its face a cam 374 which is adapted upon rotation to engage and move the roller 375 of a lever 376 that is pivotally supported at 377 from a bracket 378 mounted on the frame structure. The opposite end of the lever 376 is formed as a yoke 379 which operatively engages the end of a pin 380 that is axially movable within the sleeve 332 and is adapted to be moved upon engagement of the cam 374 with the lever; the operation moving the pin to an extended position beyond the winding head 312 where it engages the end of one of the supporting shafts 371 attached to the gripper control bars 369 and moves the control bars from the position of Fig. 26 to the position of Fig. 27, as described above. In the normal dwell position of the winding head the pin 380 stands in retracted position so that it does not interfere with the indexing travel of the mandrel assembly. The cam contour is such that actuating movement of the pin takes place just as mandrel rotation is initiated and consequently gripping movement occurs before the paper strips may be displaced from a proper gripping relationship. The pin is returned to retracted position after the actuating travel by provision of a spring 381 (Fig. 10). The gripper actuating mechanism just described goes through its cycle of movement for each rotation of the winding head. However, the gripper control member is moved during the initial turn of the winding head and subsequent actuation exerts no further control. A suitable offset portion 382 is provided on the stop lever 341 to permit passage of the cam 374 past the stop lever upon rotation of the gear 343.

The gripper control bars 369 are maintained in the position described above, which is that illustrated in Fig. 27, until the mandrel begins its advance from the label applying position. During this indexing travel the bars 369 are moved from the gripping position of Fig. 27 toward the initial position of Fig. 26; the movement first bringing the bars to the intermediate position of Fig. 28 wherein control is removed from the gripper members so that they are free to be turned angularly by withdrawal of the container bodies at the stripping position. This free movement of the gripper fingers obtains when the cams 369a and 369b are both removed from contacting engagement with the operating pins 368 and the collars 364 of the gripper rods as shown in Fig. 28. The angular movement of the gripper fingers to the released position takes place with initial withdrawal of the container bodies from the mandrel, and occurs because the adhesively coated layers between which they interfit act to cam them away from interengagement. This movement obtains freely because there is no restraining force acting on the rods 361. The angular movement, however, is limited to substantially a 90° travel by engagement of the stop pin 367 with the cooperating stop pin 367b as mentioned above. During the next indexing travel, which advances the mandrel from the stripping station to the winding station, the control bars 369 are moved further towards the left to cause the cams 369a to engage the operating pins 368 and return the gripper parts to the position illustrated in Figs. 25 and 26 as hereinabove described.

The return movement of the gripper control bars, which is the travel from the position of Fig. 27 to that of Fig. 26, is obtained from a cam that is fixedly positioned on the machine frame and is arranged to engage laterally projecting rollers that are provided on each of the mandrels. Referring to Fig. 19 the supporting shaft 371 that is attached to one end of the gripper control bars 369 carries a cross pin 390 that is of sufficient length to project through diametrically opposed axially positioned slots 391 (Figs. 19 and 25) provided in the reduced portion 287 of the mandrel between the gear 286 and spider 295. The pin 390 is received within and fixed to a sleeve 392 that is adapted to slide axially on the mandrel portion 287 within the limits of the slots 391. Each collar 392 has fixed thereto a roller 393 positioned as shown in Fig. 19. The operating cam for the roller comprises a track 394 that is arcuate with respect to the center of rotation of the mandrel assembly and extends from a point near the label applying station to a point near the winding station. The face of the cam track is inclined with respect to a plane extending transversely of the mandrel axis and is supported by bracket 395 in a position to be engaged by the rollers 393 upon indexing movement of the mandrel assembly. The lift of the cam track is such that the gripper control member 365 is moved from the position of Fig. 27 to the position of Fig. 28 while the roller 393 traverses the portion of the track between the label applying station and the stripping station, and is moved from the position of Fig. 28 to the position of Fig. 26 during the indexing travel between the stripping station and the winding station. As no rotational movement of the mandrels occurs with respect to the mandrel assembly during this traverse the mandrel rollers 393 are maintained in operating relationship with respect to the cam track.

The mandrels are constructed so that they may be expanded and contracted during traverse of the operating cycle to facilitate removal of the wound container bodies at the stripping station. As shown in Fig. 25, the mandrel winding portion 288 is formed with diametrically opposed axially extending slots or grooves 398 that continue for the full extent of the mandrel portion that receives paper. Plates 399 are fitted within these grooves and are arranged to move radially therein. The plates 399 have an arcuate outer face 400 corresponding to the mandrel contour and an inner face 401 of saw-tooth form. Intermediate each plate 399 and the bottom face 402 of the groove thereof are positioned bars 403 having a smooth flat inner face 404 freely slidable on the groove face 402, and a saw-tooth outside face 405 having a contour corresponding to the inner face 401 of the plates 399 and adapted to interfit therewith. The plates 399, which form a portion of the winding periphery, are held in place through provision of shoulder screws 406 that extend therethrough and are spaced axially along the mandrel. The screws have a head portion 407 that stands within a counterbore 408 formed in the plates 399. Coil springs 409 are provided under each screw head and bear against the plates urging them inwardly to a collapsed position wherein they stand with the outer faces some distance below the mandrel periphery as indicated in Fig. 25.

The bars 403 are movable axially of the mandrel in the grooves within which they are held and, by moving, control expansion or collapse of the plates. The bars are connected with the gripper control members 369 so that plate movement takes place in accordance with movement of the gripper fingers. As shown in Figs. 26 to 28, the control members 369, toward one end of the mandrel, are provided with a cross pin 410 which extends through the supporting shaft 371 at that end and through suitable, elongated slots 411 provided in the mandrel portion 288 and is attached to the ends of the bars 403 as indicated at 412. The bars 403 are provided with suitable, elongated slots 413 which receive the screws 406 and permit axial movement of the bars 403 relative to the mandrel and the plate members 399.

At the winding station (Fig. 26) wherein the gripper fingers are extended to receive the paper strips therebeneath the bars 403 stand in a position such that the plates 399 are collapsed as shown in Fig. 25. It is again pointed out that the gripper positioning of Figs. 25 and 26 exists only when no paper is wound on a mandrel. When the grippers move to clamping position, which is upon initial application of paper to a mandrel, and which takes place by movement of the control members 369 to the opposite extreme of travel as shown in Fig. 27, the plates 399 are moved outwardly by axial travel of the bars 403 to the position of maximum expansion wherein they stand at substantially the mandrel periphery. The initial gripper release, which is the position of Fig. 28, produces sufficient collapse of the plates 399 to permit ready withdrawal of the formed container bodies.

As mentioned above, the winding portion of each mandrel is of material length; in the present instance being such that eleven container bodies are simultaneously accommodated in side-by-side relationship. This necessitates a gripper control member of like length. The control bars 369 are supported for sliding movement at each end of the mandrels as described above and receive some additional support from operating engagement with the gripper parts. Additional guiding and supporting means are afforded in the form of upper and lower pins 414 which, as shown in Figs. 26 to 28, have threaded head portions 415 that are received within the mandrel shell, and have extending ends 416 that bear against the top and bottom of the gripper control member. Spacing members 417 are provided between the control bars 369 and the lower pins 414, one of which is provided at each of the connected ends of the bars 369 and only a portion of which is shown in the drawings, have their extended ends received within a suitable, elongated slot provided in the spacing members as is indicated at 418 and serve to guide and support the bars 369 in their travel axially of the mandrel. The upper pins 414 serve as pressure pins and are spaced axially of the mandrel as needed.

It will be evident from the foregoing description that all parts of the gripper mechanism which are likely to become broken or to require adjustment are mounted on the rod 361 for removal as a unit through the mandrel opening 363a. To remove the gripper members it is only necessary to move the control bars 369 to the intermediate position of Fig. 28, remove the set screws 362c and pull the gripper member upwardly through the opening 362a. As shown in Fig. 25 the control bars 369 are spaced sufficiently far apart to permit the collars 364 and 365 to pass therebetween when the control member has been moved to the intermediate position of Fig. 28. The gripper control mechanism which remains in the mandrel comprises a relatively heavy rigid structure that is not likely to become broken or require frequent adjustments.

Having described the mandrel actuating mechanism, attention is now directed to the operations performed on the paper strips at the different indexed positions of the mandrels. As mentioned above, mandrel rotation is initiated at the winding station in timed relationship with the feed of the severed paper strips so that the forward edges of the advancing strips are clamped to the mandrel by actuation of the gripping fingers during the initial mandrel movement. As the winding movement progresses an adhesive is applied to the outer face of the strips; the arrangement being such that the application is initiated on the leading edges of the strips and is maintained until the peripheral surface of the wound tubes is entirely covered.

The application of adhesive obtains through provision of a tank and applying roll structure that stands in the vicinity of the winding station and comprises a pick-up roll 430 and a transfer roll 431. The roll mechanism rotates continuously but is actuated to adhesive applying position in timed relationship with the other intermittently operated parts. As shown in Fig. 4, the adhesive supply is contained in a tank 432 that extends transversely of the machine for a distance sufficient to accommodate therein a pick-up roll 430 of such length that the entire winding extent of the mandrels may be covered. The tank 432, as shown, is arranged as a double walled structure including an outer wall 433 spaced from the inner wall 434 by an amount sufficient to accommodate a quantity of water that may be heated to maintain the adhesive at a proper temperature. As shown, electrical heating coils 435 are provided beneath the outer tank wall 433.

Rotational movement of the adhesive applying mechanism is derived from the continuously rotating shaft 21 of the common power source. As shown in Fig. 9 the shaft 21 has fixed thereon a pinion 21a which meshes with a gear 21b that has fixed thereto a sprocket 21c over which runs a chain 436 that also passes over a sprocket 437 that is mounted on the shaft of the pick-up roll 430. The transfer roll 431 is rotatably mounted in brackets 438 (Fig. 4) which supports the roll for pivotal movement about the axis of the pick-up roll 430. Suitable gearing such as that disclosed in the copending application Serial No. 165,352 is provided between the sprocket 437 and the rolls 430 and 431 to cause rotation of the lower pick-up roll 430 at a reduced speed relative to the rotational movement of the sprocket and to drive the upper transfer roll 431 at a greater speed than the pick-up roll 430. This has been found advantageous in providing a controlled quantity application of adhesive in proper distribution; satisfactory results in spreading a predetermined smooth, uniform surfacing of adhesive on transfer roll 431 having been secured with such roll rotating at a speed approximately seven times that of pick-up roll 430. To provide a further control of the quantity of adhesive applied, the roller spacing between the two rolls may be varied by suitable means such as that disclosed in said copending application.

The transfer roll 431 is arranged to be moved into and out of adhesive transferring relation with the paper strips at a predetermined time in the cycle in order to effect application of the adhesive to the entire web surface but not to the bare mandrel. For this purpose an operating mechanism is provided whereby the transfer roll 431 is caused to swing in timed relation to the winding operation from a clearance position with respect to the winding mandrel to an adhesive applying position wherein it engages the winding paper strips on that mandrel. As shown in Fig. 4, this control comprises a cam 440 that rotates continuously with the shaft 24 to which it is fixed. The cam 440, as shown, is formed to include a depressed portion 441 having an angular extent which defines the interval of adhesive application. The operating connection from the cam to the supporting structure of the roll 431 includes a bell crank 442 pivotally mounted on a stub shaft 443 and including a cam engaging arm 444. The opposite arm of the bell crank is connected by means of a link 445 to an arm 446 that is fixed to a cross shaft 447. The cross shaft has at opposite ends thereof arms 448 connecting with upwardly extending links 449 that connect to arms 450 that are provided on each of the roll supporting brackets 438. Coil springs 451, which are supported at one end upon the machine frame structure, bear against the roll brackets 438 and yieldingly urge the transfer roll 431 toward the applying position. For purpose of illustration the transfer roll is shown in Fig. 4 as moved under influence of the springs 451 into adhesive applying position, it being understood that the positioning of the cam 440 is such that this movement takes place just as the leading edges of the strips reach the point of adhesive application on the first turn thereof and consequently that portion of the mandrel which does not have paper thereon and which passes the adhesive applying position before the strip leading edges remains free of adhesive so that in the subsequent stripping operation free withdrawal obtains.

The wound tubes comprise three full turns of paper plus an overlap of sufficient extent to avoid a radial relationship of the inner and outer body seams as mentioned, and the winding mandrel rotation comprises four full turns. This permits the application of adhesive to be maintained for an interval such that the entire outer surface of the wound strip receives a coating; the transfer roll being withdrawn to the dotted line position of Fig. 4 at the termination of this operation and before the next following mandrel reaches the winding station. During the application of adhesive the springs 451 cause the transfer roll 431 to press against the paper strips with sufficient pressure to provide an ironing action during the winding operation.

A manual control is provided so that the glue transfer roll 431 may be maintained in a retracted position if desired. As shown in Fig. 4, a stop member 452 is pivotally mounted in a stub shaft 453 for rocking movement beneath the cam operated bell crank 442. The stop member 452 has a link connection 454 to a crank 455 that is accessible on the side of the machine (Fig. 1) and is movable to swing the arm 452 beneath the bell crank 442 to hold it in the position that maintains the roll 431 removed with respect to the winding mandrel.

In order to insure positive sticking of the paper material at the inner seam of the wound container body a means is provided for applying a preliminary coating of adhesive upon a relatively narrow area of the paper strip which directly overlies the inner lap at the seam of the body, thus providing an increased quantity of adhesive between the overlapped portion of paper material that lies directly adjacent the inner seam. Referring to Figs. 4 and 31 an auxiliary adhesive applying roll 460 is supported on the machine between the feed roll pair 156 and the winding station 276 and extends transversely of the machine for the full width of the paper strips fed to the winding mandrel. As shown in Fig. 31 the adhesive applying roll 460 is carried by arms 461 which extend substantially vertically of the machine adjacent each end of the roll shaft 462 and are provided with suitable bearings within which a reduced portion 463 of the shaft is rotatably mounted. The lower end of each arm 461 is pivotally connected at 464 to an arm 465 which is rigidly attached to a shaft 466 which extends transversely of the machine and is rotatably supported on the inner adhesive containing tank 434. The roll 460 is adapted to be moved vertically from a lowered position, shown dotted in Fig. 31, in which the roll engages the transfer roll 431 to the raised full line position of this figure in which it contacts the under surface of the paper strips as they are advanced by the feed rolls 156. The roll is guided in this movement by means of a pair of brackets 467 which are attached to the frame structure adjacent each end of the roll shaft and are provided with U-shaped guide slots 468 within which a circular laterally projecting hub 469 provided on the arms 461 is adapted to slide. A cap member 470 secured in place by bolt 471 normally limits the upward travel of the roll 460 and provides for the ready removal and replacement of the roll 460 when desired. Downward movement of the roll 460 is limited by the bottom of the slot 468 and engagement of the roll with the transfer roll 431.

The roll 460 is moved from its lowered position where it engages the transfer roll 431 to its raised position in which it contacts the paper strips by means of a crank arm 475 which is fixedly attached at one end to the cross shaft 466 and is pivotally connected at 476 to the upper end of an operating lever 477. The operating lever 477 is actuated in proper timed relation to the advance of the paper strips by means of a suitable cam (not shown) carried by the main drive shaft 24 of the machine, the arrangement of parts being such that the lever 477 is depressed to raise the adhesive applying roll 460 into contact with the underside of the paper strips at a point which is spaced from the leading edge of the strips by a distance corresponding to one complete revolution of the mandrel and to retain the roll in the raised position for a period of time sufficient to apply a narrow band of adhesive to the advancing paper strips. When a band of adhesive having a desired predetermined width in the direction of feed of the paper strips has been applied the actuating cam on the main drive shaft releases the operating lever 477 and permits the roll mechanism to fall by gravity to its lowered position where it again contacts the transfer roll 431. The paper strip is thus provided with a band of adhesive which directly overlies the leading end portions of the paper strip as the container body is wound, and positive sticking of the wound container body at the inner seam is assured. Since the roll shaft 462 is freely rotatable in the bearings carried by the upper ends of arms 461 the roll 460 will be caused to rotate upon contact with the transfer roll 431 and with the advancing strips of paper material, thus obtaining a supply of adhesive from the transfer roll and applying a uniformly distributed band of adhesive to the desired portion of the paper strips.

As mentioned above the side edges of the paper strips are bent in such manner as to cause these edges to bend outwardly from the mandrel as indicated at 213 in Fig. 13 and provide outwardly flaring ends on the wound container body as indicated at 214 in Fig. 13a. In order to avoid flattening out of these bent portions of the paper strips during application of the adhesive and winding of the container bodies at the station 276 the adhesive transfer roll 431 is provided with a plurality of grooves which, as illustrated in Fig. 13, are spaced across the roll in proper position to receive the outbent edges of the paper strips and prevent any pressure being exerted thereon during the time that the transfer roll is caused to press against the mandrel at the winding station. These grooves are designated by the reference numeral 480 in Figs. 13 and 32. The grooves 480 also provide for applying an additional quantity of adhesive on the edges of the paper strip which form the ends of the wound container body. These grooves form pockets or wells which collect a greater depth of adhesive than is received on the external surface of the transfer roll and this additional quantity of adhesive is applied to the outwardly bent edges of the paper strips and provides an adhesive coating which is thicker than that provided on the main portion of the strips as indicated by the heavy lines at 481 in Fig. 13a. This additional thickness of adhesive on the edge portion of the paper strips provides a strong union between the various layers of paper material at the end of the wound container body and serves to prevent any breaking away or separation of the layers upon the application of the end closures. The excess adhesive also serves as a stiffening material for reinforcing the ends of the formed container body.

In order to facilitate the application of the end caps in crimped, sealed relationship to the interior of the container body it is desirable that the application of this increased quantity of adhesive to the side edges of the paper strips be confined to that portion of the paper strips which form the inner layers of the container body as illustrated in Fig. 13a, and that the exterior surface 482 on the outwardly flaring ends of the container body be maintained substantially free of any adhesive. As shown in Fig. 13a the labels 320 have a width somewhat less than the length of the container body and accordingly no adhesive is required on the exterior body portion 482 that extends beyond the edge of the label. A means is accordingly provided for removing the adhesive from the grooves 480 at a proper point in the operating cycle. Referring to Figs. 4 and 32 a cross shaft 485 is rotatably mounted on the tank 434 and carries a plurality of scraper fingers 486 which are attached to the shaft for movement therewith and are adapted to be moved from the dotted position of Fig. 32 to the full line position in which they are received within the grooves 480 of the transfer roll 431 and serve to scrape the adhesive from the inner surface of the grooves. The shaft 485 is rocked by means of an operating lever 487 which is provided with a straight portion 488 which extends downwardly within the tank 434 adjacent the shaft 485 and with a portion 489 which overhangs the tank and slopes downwardly on the exterior side thereof. The portion 488 of the operating lever 487 is attached to the shaft 485 by means of a lug 490 which also carries one of the scraper fingers 486. A pair of screws 491 and 492 are threaded through the member 488 above and below the shaft 485 and serve as adjustable limit stops for the rocking movement of the shaft. The screws 491 and 492 are locked in the adjusted position by means of nuts 493. A hook-shaped plate 494 is attached to the end wall of the tank 434 and is provided with a suitable slot which serves as a guide for the overhanging portion 489 of the operating lever.

The weight of the overhanging portion 489 of the operating lever 487 is such that the shaft 485 is normally rocked in a clockwise direction as viewed in Fig. 32 to its limit position in which the screw 491 engages the member 494 and the scraper fingers 486 are disengaged from the grooves 480 and occupy the dotted position illustrated. The shaft is rocked in a counterclockwise direction as viewed in Fig. 32 to its limit positon determined by screw 492 in which the fingers 486 are moved into the grooves by means of a camming roller 495 that is carried by an arm 496 pivotally connected to the lower end of the overhanging portion 489 of the operating lever 487 as indicated at 497. The arm 496 is adapted to move from the dotted position of Fig. 32 to the full line position illustrated, and when it occupies the dotted position it permits the lever 487 to fall by gravity and rock the scraper arms out of engagement with the grooves 480 in the transfer roll. Upon movement of the arm 496 to the full line position shown the roller 495 engages the wall of the tank 435 and cams the end of the lever 487 upwardly and outwardly about the axis of the shaft 485, thus causing the shaft 485 to rotate in a counterclockwise direction as viewed in Fig. 32 and swing the scraper fingers 486 into engagement with the grooves 480.

The arm 496 is moved from the dotted position to the full line position by means of a cam that is actuated by a conveyor which serves to strip the container bodies from the mandrels at the stripping station 279. As shown, a shaft 498 is rotatably mounted adjacent the conveyor 500 at the stripping station and is supported by means of suitable bearings carried by brackets 501 which are clamped to one of the guide tracks 502 of the conveyor. An arm 503 is keyed to the shaft 498 and carries at its upper end a roller 504 that is adapted to be engaged by a projection 505 carried by the conveyor 500. An arm 506 is also keyed to the shaft 498 and is provided at its outer end with a slot 507 within which a projecting finger 508 attached to the arm 496 is received. The proportioning of parts is such that when the arm 496 occupies the dotted position the roller 504 will be swung to a position, shown dotted in Fig. 32, in which it will be engaged by the projection 505 of the conveyor. At a proper point in the operating cycle the projection 505 engages the roller 504 and causes the arm 503 to move towards the left in Fig. 32, thus causing the shaft 498 to rotate in a counterclockwise direction as viewed in this figure. This rotation of the shaft 498 causes the upper portion of the slotted arm 506 to engage the finger 508 of the arm 496 and swing the arm 496 to the full line position indicated in which the roller 495 serves to cam the scraper fingers 486 into engagement with the grooves of the transfer roll.

As will be more fully described hereinafter conveyor 500 is driven by the common power source of the machine in coordinated timed relationship to the operation of the other machine parts. The projections 505 are so positioned on the conveyor that they will engage the roller 504 and swing the finger 486 into the scraping position at a point in the tube winding cycle which will cause the grooves 480 to be substantially free of adhesive when the application of adhesive to the outer surface of the main portion of the container body begins. As shown by the arrow the transfer roll 431 rotates in a counterclockwise direction as viewed in Fig. 32 and accordingly the adhesive which is picked up from the roll 430 is removed from the grooves by the finger 486 prior to its application by the container body. The scraper fingers remain in contact with the groove surfaces during the entire time that the transfer roll is in engagement with the outer surface of the container body.

The scraper fingers are rocked to the dotted position of Fig. 32 at the end of the tube winding and adhesive applying operation to permit the application of adhesive to the ends of the inner layers of the next wound tube by means of the same mechanism that operates the transfer roll 431 to its clearance position with respect to the mandrel at the winding station. As shown, the lever 449 that actuates the transfer roll 431 from the adhesive applying to the clearance position is provided with a laterally projecting finger 510 that is adapted to engage an arm 511 carried by the rock shaft 498. The arm 511 is keyed to the shaft 498 in a proper axial position to be engaged by the finger 510 upon upward movement of the lever 449. The proportion of parts is such that when the lever 449 moves upwardly to swing the transfer roll away from the mandrel at the end of the adhesive applying operation the finger 510 engages the arm 511 and rocks the shaft 498 in a clockwise direction as viewed in Fig. 32 to move the roller 504 to the dotted position illustrated where it is adapted to be engaged by a projection 505 on the conveyor during the next tube winding operation. This clockwise rotation of the shaft 498 also causes the lower portion of the slotted arm 506 to engage the finger 508 of arm 496 and move the roller 495 out of camming engagement with the tank 435 so that the overhanging portion 489 of the lever 487 is free to fall by gravity to rock the scraper fingers to the dotted line position in which they are disengaged from the grooves 480. The arm 496 swings about the pivot 497 to its dotted position illustrated. When the lever 449 is lowered to permit application of adhesive during the next winding operation the finger 510 also moves downwardly out of engagement with the arm 511, thus permitting shaft 498 to rotate in a counterclockwise direction under control of cam 504 to again rock the fingers 486 into scraping position in the manner hereinabove described.

Indexing movement of the mandrels following the winding operation brings the wound tubes to the dwell station 277 where the adhesive securing the body in wound form is permitted to obtain an initial setting while the bar 319 is pressing against the container body at the outer seam and maintaining the entire tube in a tightly wound condition. At this point it is again pointed out that the trailing ends of the paper strips which form the container bodies are given an initial bending that causes the outer lap of the wound container body to tend to hug the mandrel, and since the angular travel of the mandrels between the stations 276 and 277 is relatively small the tubes will remain in a tightly wound condition during the indexing movement between the stations.

The next indexing movement of the mandrels brings the wound container bodies with the adhesive partially set to the label applying station 278 where, as above mentioned, the mandrel is angularly indexed and rotated in such manner as to cover the outer seam of the container bodies very shortly after label application begins. Referring now to the label applying mechanism, and to Figs. 4 and 33 through 40 in particular, the labels 320 are shown as arranged in a plurality of stacks 320a which are received within a unitary bin structure 515 that extends transversely of the machine and provides a plurality of separated bins 516 that are arranged side by side and support the labels in proper positioning relative to the positioning of the container bodies on the mandrel. The bin structure 515 is inclined to the horizontal with the upper ends of the bins 516 supported adjacent the point C in Fig. 22 where initial label application begins, and comprises a bottom member 517 that extends entirely across the bin structure, a lower end wall 518 that also extends across the entire structure, side walls 519, separating walls 520, and lips or guides 521 that are attached to the upper ends of the walls 519 and 520 and overhang the upper ends of the labels contained in the bins. Since the width of the label is somewhat less than the height of the container body as mentioned above and shown in Fig. 13A, a spacing is provided between the adjacent stacks of labels, and the separating walls 520 of the bins fit within this space. The labels are arranged in the bin face upward and are withdrawn from the bottom of the stack. This permits the ready insertion of a new supply of labels without the necessity of stopping the machine.

To permit the withdrawal of the lowermost or outer label in each stack during the label applying operation the bottom member 517 terminates short of the upper ends of the bins, as indicated at 522 (Fig. 34), and the upper ends of the labels overhang the upper end of the bottom member 517. The bottom label in each stack is thus adapted to be pressed against the adhesive coated body on the mandrel 212 and to be withdrawn from the stack upon rotation of the mandrel. As mentioned above the upper ends of the bins are positioned adjacent the point C of Fig. 22 and the upper ends of the labels are applied to the container body at this point as shown in Figs. 34 and 36 through 40.

The bin structure is supported by means that provides for movement of its upper end towards and away from the mandrel at station 278. Referring to Fig. 4 a pair of brackets 525 and 526 are attached to the bin structure 515 adjacent each side thereof, and the brackets 525 are pivotally connected at 527 to the frame structure of the machine. A depending strut 528 is attached to each of the brackets 526 and carries at the lower end a roller 529 that is adapted to ride on the upper surface of a disk cam 530 carried by a shaft 531 positioned below the bin structure. The contour of the cams 530, one of which is provided for each of the struts 528, is such that the struts are raised and lowered at proper points in the label applying cycle to swing the bin structure about the pivot 527 from a position in which the label stacks engage the container body on the mandrel at the station 278 to a position in which the stacks are separated from a mandrel at this station. The shaft 531 is rotated in proper timed relationship to the other operations of the machine by means of a chain 532 that runs over a sprocket 533 carried by the continuously rotating shaft 24 and a sprocket 534 carried by the shaft 531.

A means is also provided to assure that only the lowermost label from each stack is withdrawn during rotation of the mandrel at the label applying station. This means also serves to press the applied label firmly against the container body during the rotational movement of the mandrel. The means comprises a plurality of flexible fingers 535 that are provided with upwardly projecting shoulders 536 and are adapted to be inserted between the lowermost labels and the remaining labels of each stack with the shoulder 536 engaging the ends of the upper labels during rotation of the mandrel at the label applying station. As shown in Fig. 33 a separate finger 535 is provided for each stack of labels and the fingers have a width substantially the same as the width of the label. The fingers 535 are carried by brackets 537 that are clamped between a pair of angle irons 538 that extend transversely of the machine and provide a support for the fingers. The angle irons 538 are clamped together by means of bolts 539 that also extend through the clamped ends of the brackets 537. The angle irons 538 are supported at each end by means of an arm 540 to which the angle irons are pivotally connected as indicated at 541 to provide a rocking movement of the fingers 535. The flexible fingers 535 are normally maintained in a position in which the end of the finger is adapted to enter the space between the mandrel and the bottom of the label stack when the bins are in the raised position relative to the mandrel by means of a spring 542 and a plunger 543 that are carried by each of the arms 540 and engage laterally extending fingers 544 secured to the angle irons adjacent each of the arms 540. As shown in Fig. 34 the arms 540 carry a housing 545 provided with a recess 546 within which the plunger 543 having a stem 547 is adapted to slide. The spring 542 which is of the spiral type is received within the recess around the stem 547 and normally urges the plunger outwardly of the housing 545. Outward movement of the plunger is limited by nuts 548 which screw on a threaded portion 549 of the stem 547 that extends externally of the housing 545 through a suitable opening provided therein. The nuts 548 also provide for adjusting the normal position of the plunger.

Figure 39:
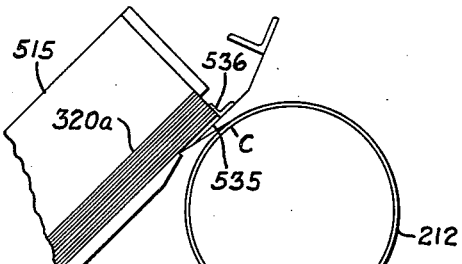
Fig. 39 is a fragmentary diagrammatic view looking towards the left-hand side of the machine and illustrating a third step in the label applying mechanism.
Figure 40:
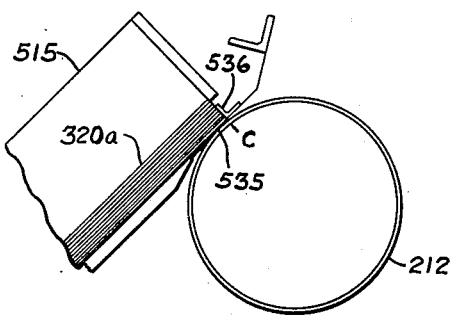
Fig. 40 is a fragmentary diagrammatic view looking towards the left-hand side of the machine and illustrating a fourth step in the label applying operation.

The pivotal connection between the angle irons 538 and the arms 540 and the resiliently mounted plunger 543 permit rocking movement of the fingers 535 from the normal position in which the finger is spaced from the mandrel as illustrated in Fig. 39 to a position illustrated in Fig. 40 in which the fingers press against the label that is being applied to the container body and serve to iron the label during the application thereof. This rocking movement is obtained from lugs 546 that are mounted on the sides 519 of the bin structure and are adapted to engage and depress fingers 547 carried by one of the angle irons 538. As shown in Figs. 33 and 34 the fingers 547 are mounted eccentrically of the pivotal axis of the angle irons and are provided with laterally extending portions 548 adapted to be engaged by notches 549 in the lugs 546. The arrangement of the parts is such that when the fingers 535 are inserted between the lowermost label and the remainder of the label stack as illustrated in Fig. 39 and the bin structure is moved towards the mandrel as illustrated in Fig. 40 the notches 549 in the lugs 546 will engage the finger portions 548 and cause the fingers to rock about the pivotal axis 541 and press firmly against the lowermost label at its point of application to the container body. The pressure exerted by the flexible fingers 535 is adjusted by screws 549a that thread through the lugs 546 into the notches 549 and engage the upper sides of the finger portions 548. The screws 549a are maintained in the adjusted position by lock nuts 549b.

The arms 540 are carried by a cross shaft 550 that provides for moving the fingers 535 from the inserted position illustrated in Figs. 39 and 40 to a withdrawn position illustrated in Figs. 33, 34, 36, 37 and 38. For this purpose the arms 540 are fixedly attached to the shaft 550 and a crank arm 551 is also fixedly attached to the shaft adjacent each end thereof; the shaft 550 being suitably mounted on the frame structure for rotation about its axis. The crank 551 is pivotally connected at 552 to an operating lever 553 that extends substantially vertically of the machine and is pivotally connected at 554 to one end of the bell crank 555. The bell crank 555 is pivotally mounted on a shaft 556 carried by the frame structure and carries a roller 557 at the end of its other arm. The roller 557 is adapted to be engaged by a suitable cam 558 that is carried by the cam 530 laterally of the cam surface upon which the roller 529 rides. The contour and positioning of the cam 558 is such that at a proper point in the label applying cycle the roller 557 is raised by the cam, thus causing the operating lever 553 to move downwardly and swing the fingers 535 to the withdrawn position. When the roller 557 is released by the cam 558 the arms 540 and angle irons 538 fall by gravity and move the fingers 535 to the inserted position in which the shoulder 536 engages the upper ends of the label stacks. When the bins are depressed following insertion of the fingers 535 to press the fingers against the lowermost label being applied to the container body the fingers 548 interlock in the notches 549 of lugs 546. The shoulders 536 are thus locked in engagement with the ends of the label stacks and prevent any displacement of the upper labels during withdrawal and application of the lowermost label upon rotation of the mandrel at the label applying station.

As shown in Fig. 4 the pivot 527 of the bin structure is located above a plane passing through the bottom of the bins. This arrangement of the pivot causes the upper ends of the labels to move slightly outward as well as upward when the bins are raised away from the mandrel. The travel of the label stacks is thus such that after the upper end of the lowermost label has been pressed into engagement with the adhesive on the container body and as the bins are moved away from the mandrel to provide a spacing between the bottom label and the remaining labels for the insertion of the fingers 535, a slight slack is provided in the lowermost label adjacent the glued end thereof. Any tendency for the end of the bottom label to pull away from the container to which it is adhesively attached is accordingly avoided.

Figure 37:
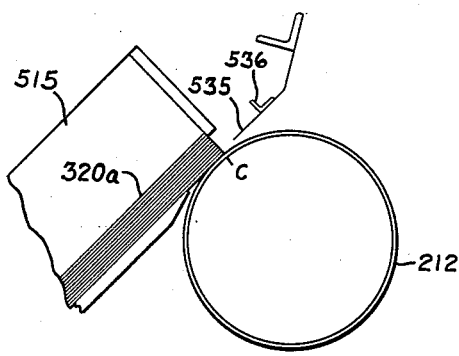
Fig. 37 is a fragmentary diagrammatic view looking towards the left-hand side of the machine and illustrating one step in the label applying operation.
Figure 38:
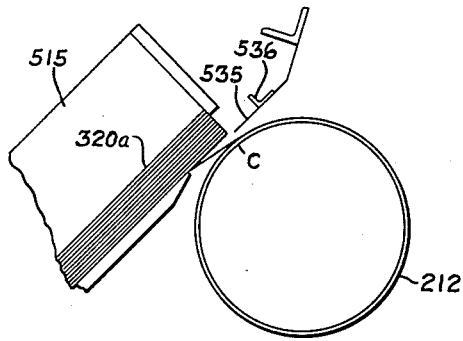
Fig. 38 is a fragmentary diagrammatic view looking towards the left-hand side of the machine and illustrating a second step in the label applying operation.
Figure 35:
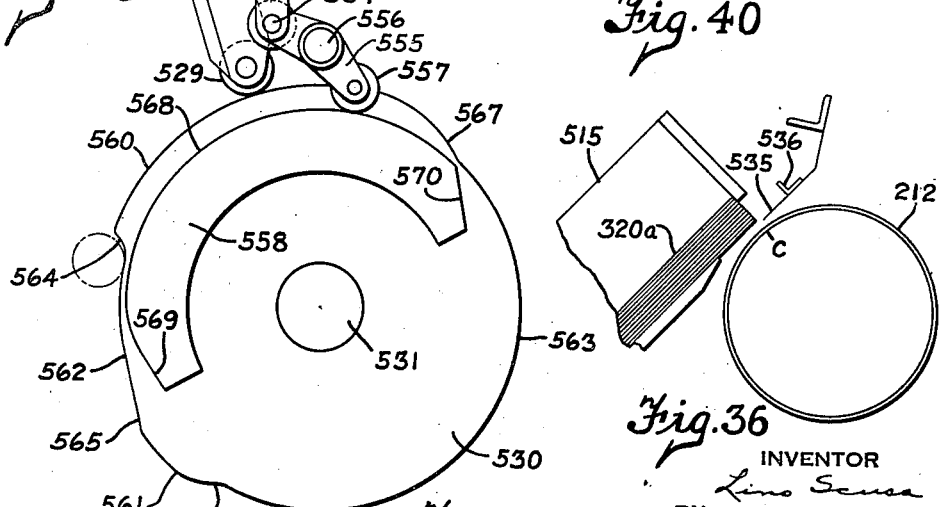
Fig. 35 is an elevational view of one of the cams for controlling the operation of the label applying mechanism.
Figure 36:
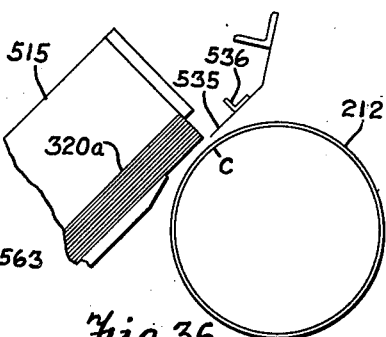
Fig. 36 is a fragmentary diagrammatic view looking towards the left-hand side of the machine and illustrating the position of the label mechanism at the beginning and end of the label applying operation.

The operating cycle of the label applying mechanism is illustrated in Figs. 35 through 40. As shown in Fig. 35 the cam 530 is provided with raised portions 560 and 561 and depressed portions 562 and 563 that are joined to the raised portions by sloping portions 564, 565, 566 and 567. The raised portions 560 and 561 and depressed portions 562 and 563 are arcuate in shape and concentric with the shaft 531. The cam 558 comprises an arcuate face 568 provided with downwardly inclined portions 569 and 570 at each end thereof. The relative length and positioning of the various portions of the cams 530 and 558 are substantially as shown in Fig. 35, and the operation of the label applying mechanism is as follows. During indexing movement of the mandrels the roller 529 is riding on the raised portion 560 of the cam 530 and the roller 557 is engaged by the arcuate face 568 of the cam 558 as illustrated in Fig. 35, thus causing the bin structure to be raised upwardly away from the mandrel postion at the station 578 and the spring fingers 535 to be swung to the withdrawn position relative to the stacks of labels as illustrated in Fig. 36. The rollers 529 and 551 continue to ride on the cam surfaces 560 and 568 during the entire indexing movement of the mandrels. After the mandrels have come to rest at the label applying station the roller 529 reaches the downwardly sloping portion 564 of the cam 530 and permits the upper end of the bin structure to be lowered by gravity to press the overhanging end of the lowermost label against the adhesive coating on the container body as illustrated in Fig. 37. Since the roller 557 is positioned ahead of the roller 559 in the direction of rotation of the cams the roller 557 will still be engaged by the arcuate portion 568 of the cam 558 and the fingers 535 are maintained in the withdrawn position illustrated in Fig. 37. The weight of the stack causes the lowermost label to press firmly against the adhesive coating on the container body during the time that the roller 529 is riding on the depressed portion 562. After a relatively short period of time the upper end of the bin is again raised away from the mandrel by engagement of the roller 529 with the upwardly sloping portion 565 of the cam and this movement causes a separation between the lowermost label which sticks to the container body and the remainder of the label stack which rises with the bin structure as illustrated in Fig. 38. During this upward movement of the bin structure the roller 557 is still engaged by the arcuate surface 568 of the cam 558 and the fingers 535 remain in the withdrawn position as shown in this figure. When the bin structure has been moved to its raised position and the roller 529 is riding on the raised portion 561 of the cam 530 the roller 557 reaches the inclined portion 569 of the cam 558 which permits the roller to move downwardly and cause the fingers 535 to move by gravity into the inserted position illustrated in Fig. 39. As soon as the fingers 535 have moved to the inserted position the roller 529 reaches the downwardly sloping portion 566 of the cam 530 and the bin structure again swings downwardly towards the mandrel. During this downward movement of the bins the notches 549 in the lugs 546 engage the portions 548 of the fingers 547 and cause the fingers 535 to rock about the axis 541 to a position in which the fingers press the lowermost label firmly against the container body as illustrated in Fig. 40. When the roller 529 reaches the depressed portion 563 of the cam 530 and the fingers 535 have been pressed against the lowermost label to cause a firm adhesion between the label and the container body at the point of initial label application C the mandrel begins to rotate and the bottom label is withdrawn from the stack and wrapped tightly about the body of the container. The roller 529 continues to ride on the depressed portion 563 of the cam 530 during the entire rotational movement of the mandrel and the bin structure remains in its lowered position to press the fingers 535 against the label as illustrated in Fig. 40. As mentioned above, the mandrel is rotated through two or more complete turns to permit ironing of the applied label by means of the fingers 335. After rotation of the mandrel at the label applying station has stopped and just prior to the next indexing movement of the mandrels the roller 529 reaches the upwardly inclined portion 567 of the cam 530 and causes the bin structure to move upwardly away from the mandrel. After this upward movement of the bin structure has been substantially completed the inclined portion 570 of the cam 558 engages the roller 557 and causes the roller to be moved upwardly thus swinging the fingers 535 to the withdrawn position of Fig. 36. The rollers 529 and 557 are now engaged by the arcuate surfaces 560 and 568 of the cams 530 and 558 respectively and continue to ride on these portions of the cams during indexing movement as above described, the label applying mechanism passing through the described cycle of operations for each complete rotation of the cam 530.

For purpose of illustration the label applying mechanism is shown in Fig. 4 with the bin structure moved to its lowered position and the fingers 235 swung to the inserted position. It will be understood from the foregoing description, however, that the arrangement of parts is such that the operation of the label applying mechanism is coordinated to the indexing of the mandrels and the operation of the other machine parts, and that the label mechanism goes through the described cycle of operations in proper timed relationship to the advance and dwell of the mandrel assembly, label application taking place during the period that the mandrels occupy the label applying station 278.

Following the application of the labels the mandrel is advanced to the stripping station 279 where the container bodies with label attached are removed. It is at this station that the mandrel is released of supporting engagement at the left-hand end of the machine to permit withdrawal of the container bodies by means of the conveyor 500 that extends transversely of the machine beneath the stripping station 279 and carries suitable means for stripping the container bodies from the mandrels at a proper point in the operating cycle of the machine. As shown in Figs. 2, 4, 18 and 32 the conveyor 500 comprises horizontally extending laterally spaced parallel chains 575 that run over sprockets so positioned that the upper reach of the chains is parallel to the mandrel axis. One sprocket indicated by the numeral 576 stands at the right-hand side of the machine and is carried on a shaft 577 including a sprocket 578 over which runs a driving chain 579 which traverses a sprocket 580 on the shaft 302 that carries the barrel cam 303 that indexes the mandrel assembly. The opposite end of the chains run over a sprocket 581 rotatable on a shaft 582 carried by arms 583 which extend from the parallel track bars 502 that are positioned to provide an underlying support for the upper reach of the conveyor chain. The conveyor is of sufficient length to strip the full length of a mandrel and to deliver the container bodies therefrom to a desired point removed from the mandrel.

The conveyor structure incorporates stripping members 585 that are two in number and are spaced at opposite points on the run of the conveyor chain. The proportioning of the conveyor parts is such that the conveyor may be operated continuously from the constantly moving shaft 302, and is such that a stripping member 585 is brought into stripping position just after a mandrel is delivered thereto. The traverse of a stripping member with respect to a mandrel is completed prior to the next succeeding indexing movement, and the movement of the conveyor during the indexing travel is such that the next succeeding stripping member is brought into operating position to perform its stripping operation as the next following mandrel comes to rest in the stripping position. The stripping members, designated generally by the numeral 585, comprise a flat plate 586 having attachment to each of the chains 575 and having mounted thereon an arcuate member 587 of which the inner radius is such as to closely engage the mandrel face during the stripping movement. The positioning of the member 587 on its supporting plate 586, and the contour of this part is such that the stripping members will pass readily through the gap 294 provided in the supporting ring 283 of the mandrel structure and to likewise pass through the notches 285 provided in the mandrel assembly end member 281.

As shown in Fig. 18, the stripping conveyor extends for some distance beyond the terminal ends of the mandrels. The spacing of the conveyor chain supporting sprockets is such that a chain may be utilized of sufficient length to accommodate two strippers at opposite points on the run of the chain, and is such that continuous conveyor travel may be maintained to thus avoid the necessity for an intermittently operating drive. In other words, one of the strippers traverses the mandrel of the stripping station during each dwell interval and, during the travel that obtains within the following indexing interval, the other stripper is advanced to a position to strip the succeeding mandrel upon the next following dwell.

The operating cycle is so proportioned that the dwell interval of the mandrel assembly consumes two-thirds of the complete cycle and indexing is accomplished in the remaining one-third. The traverse of a stripper during removal of the container bodies is therefore approximately two-thirds of the upper reach or length of the conveyor. The container bodies leaving the stripping conveyor may be disposed of as desired. As mentioned above the inner seams of the container bodies have a predetermined angular position at the stripping station 219, and this positioning of the seams is maintained during removal of the conveyor bodies by the conveyor mechanism, thus providing for the convenient application of a narrow band of sealing material to the inner seams during the stripping operation.

While the process, apparatus and product herein described constitute preferred embodiments of the invention, it is to be understood that the invention is not limited to this precise process, apparatus and product, and that changes may be made therein without departing from the scope of the invention which is defined in the appended claims.

What is claimed is:

1. In a process of the character described in which a web of paper material is cut into blanks each of a size predetermined with respect to a convolute container body to be formed therefrom and are then wound into such form adapted to receive an end closure for said container body, the steps which comprise acting upon said web of paper material to remove limited portions thereof at predetermined spaced locations thereover with resultant predetermined thinning of such portions and thereafter in the cutting of said paper into said blanks effecting longitudinal and transverse cutting of the paper material to sever the paper across said thinned portions, whereby to provide spaced skived portions located to be at the end of the wound container body upon the inside convolution and to provide such skived portion at the end of the inside seam to facilitate affixing the end closure in properly sealed relation with the end of the container body.

2. In a process of the character described in which a web of paper material having a surface treated to be resistant to the material to be packaged within said container is cut into blanks each of a size predetermined with respect to a convolute container body to be formed therefrom and are then wound into such form adapted to receive an end closure for said container body, the steps which comprise acting upon said web of paper material to remove limited portions thereof from the non-treated side at predetermined spaced locations thereover with resultant predetermined thinning of such portions and thereafter in the cutting of said paper into said blanks effecting longitudinal and transverse cutting of the paper material to sever the paper across said thinned portions, whereby to provide spaced skived portions located to be at the end of the wound container body upon the inside convolution with the treated surface exposed inside the resulting container body and said skived portion of the untreated surface underlying an unaffected treated portion of the inner convolution, and to provide such skived portion at the end of the inside seam to facilitate affixing the end closure in properly sealed relation with the end of the container body.

3. In a process of the character described in which a web of paper material is cut into blanks of a size suitable for forming a container body and the cut blanks are wound in the form of a container body, the steps which comprise skiving said paper material to reduce the thickness thereof at predetermined spaced portions chosen with relation to the subsequent cutting operation to locate said skived portions at the corners of said blanks, and thereafter cutting said paper web through said skived portions to effect the severing of said blanks and the formation thereof of skived areas of limited extent in said corners.

4. In a process of the character described in which paper material is fed to a winding mandrel and is wound thereon into the form of a convolute container body, the steps which comprise bending the side edge of said paper material during the feeding operation in such manner that said edge bends slightly away from one side and beyond the plane of the paper material, and thereafter winding the paper material convolutely upon itself with said one side innermost providing an outward flare at the end of said container body.

5. In a process of the character described in which a strip of paper material is fed to a winding mandrel and is wound thereon into the form of a convolute container body having inner and outer seams, the steps which comprise skiving said paper material to provide portions of reduced thickness at said inner and outer seams, bending the side edges of said strip, and winding said strip in such manner as to cause said bent edges to turn outwardly from said mandrel and provide outwardly flaring ends on the formed container body.

6. A process of the character described for forming container bodies from paper material which comprises feeding a strip of paper material suitable for winding on a mandrel into the form of a convolute container body, bending the side edges of said strip, winding said strip convolutely in such manner as to cause said bent edges to turn outwardly from the mandrel and provide outwardly flaring ends on the formed container body with a main intermediate portion in which planes including the axis of the body intercept the surface thereof in straight lines, and applying a label to said main intermediate portion of the outer surface of said container body and inwardly of said outwardly flaring ends.

7. A process of the character described for forming container bodies from paper material which comprises feeding a sheet of paper material suitable for winding into the form of a convolute container body having an outer seam, bending a portion of the paper material in such manner as to provide a curling tendency in a substantial portion of the trailing end of said sheet, winding said sheet convolutely on a mandrel in such manner as to cause said bent portion to tend to adhere to the shape of the wound container body, moving said mandrel to a label applying station, applying a label to said wound body by effecting initial application of the label thereto in closely adjacent relation to said outer seam and continuing said label application in a direction to promptly overlie the seam to prevent the outer seam from springing away from said wound body, thereafter moving said mandrel to a stripping station, and stripping the formed body with label attached from said mandrel at said stripping station.

8. A process of the character described for forming container bodies from paper material which comprises feeding a strip of paper material suitable for winding into the form of a convolute container body, bending a portion of the paper material in such manner as to provide a curling tendency in a substantial portion of the trailing end of said strip, bending the sides of the strip, winding said blank convolutely on the mandrel in such manner as to cause said bent trailing end to adhere to the shape of the wound container body and the ends of the formed container body to flare outwardly, applying a label to the portion of the outer surface of the container body that lies between said flaring ends and with initial label application taking place in such position and in such direction as to cause said label to overlie said outer seam shortly after label application begins to provide for promptly securing the outer seam in closely adhering relation to the wound container body, and stripping the formed container bodies from said mandrel.

9. In a process of the character described for forming container bodies from paper material in which a web of paper material is unwound from a jumbo roll, severed into blanks of a length suitable for winding into the form of a container body, and fed to a winding mandrel, the steps which comprise bending said paper web during unwinding from said roll over a predetermined controlled portion thereof to cause a substantial portion of said blank to tend to curl upon itself, cutting the web transversely in predetermined relation to said bent portion to separate the web into lengths with a predetermined part of both the leading and trailing ends thereof having said curling tendency in the same direction, and winding said blank on a mandrel in convolute form with the direction of curl such that the tendency of the leading and trailing ends respectively to form a tangent and a chord with respect to the cylindrical container body is substantially eliminated.

10. In a process of the character described for forming container bodies and the like from paper material, the steps which comprise feeding a sheet of paper material, winding said sheet on a mandrel into the form of a convolute container body having overlapping portions of paper material at the inner seam, applying adhesive to the outer surface of said paper sheet while said sheet is being wound into tubular form on said mandrel, and applying a transverse band of adhesive to the opposite side of the sheet prior to winding in position to directly overlie the leading end of the sheet when wound on said mandrel to effect positive securing of said overlapping portions at said inner seam.

11. In a process of the character described for forming container bodies adapted to receive end closures thereon, the steps which comprise winding a sheet of paper material upon itself into the form of a multi-wall convolute container body having an inner and outer seam, applying adhesive to said paper sheet to adhesively secure the overlapping layers thereof forming said wall together to maintain said body in the wound form, and applying an increased quantity of adhesive to the side edge portions of said sheet that lie at the ends of the container body and form the inner layers of said wall to provide for stiffening and reinforcing the ends of the container leaving the outer layer thereof substantially free of said increased adhesive.

12. In a process of the character described for forming container bodies from paper material, the steps which comprise winding a sheet of paper material on a mandrel into the form of a convolute container body having a wall thickness comprising a plurality of layers of said paper material, applying adhesive to said paper sheet to secure said body in the wound form, applying an increased quantity of adhesive to the edges of the inside layers of the paper material that lie at the ends of the container body, and applying adhesive to a predetermined portion of the outer surface of said container body while maintaining the end edges of said outer surface substantially free of adhesive.

13. In a process of the character described for forming container bodies from paper material, the steps which comprise feeding a sheet of paper material, winding said paper sheet into the form of a container body having an overlapped portion of paper material at the inner seam, applying adhesive to said paper sheet on the side thereof which forms the outside of the container beginning with the leading edge thereof to secure said body in the wound form, and applying an increased quantity of adhesive to the side of the sheet which forms the inside of the container in a relatively narrow area and in predetermined relation to said overlapped portion to be directly adjacent said inner seam in the wound form of the container.

14. A machine of the character described for forming container bodies from a roll of paper material which comprises feed means for unwinding said roll and advancing a web of paper material, means for reducing the thickness of said web in a series of spaced areas arranged in a predetermined pattern, means coordinated with the operation of said feed means and said thickness reducing means for cutting said web longitudinally and transversely along lines which intersect in said reduced thickness areas with said portions of reduced thickness at the leading and trailing edges of said lengths and adapted to receive end closures in crimped, sealed relation thereon, said portions of reduced thickness providing for the ready sealing of the end closures at the inner and outer seams of the container bodies.

15. A machine of the character described for forming container bodies from paper material comprising means for feeding a strip of paper material, means operative during the feeding operation for bending a side edge of said strip outwardly from one face of said strip and slightly beyond the plane thereof, and mandrel means for receiving the unbent portion of said sheet with said face innermost and for winding said sheet into the form of a multi-wall convolute container body with said edge portion flaring outwardly at the end.

16. A machine of the character described for forming container bodies from paper material comprising means for feeding a web of paper material suitable for winding on a mandrel into the form of a convolute container body having inner and outer seams, means for reducing the thickness of said paper material in predetermined areas to provide portions of reduced thickness at said inner and outer seams, means for bending a side edge of said paper material, and mandrel means for winding said paper material in such manner as to cause said bent edge to turn outwardly from said mandrel and provide an outwardly flaring end on the container body.

17. A machine of the character described for forming container bodies from paper material comprising a winding mandrel, means for feeding a strip of paper material suitable for winding on said mandrel into the form of a convolute container body, means for bending a side edge of said strip in such manner as to cause the end of the wound container formed by said edge to turn outwardly from said mandrel, means including a roller for ironing said strip against said mandrel during the winding operation, and means for maintaining said bent edge of the strip free from ironing action by said roller during the winding operation.

18. A machine of the character described for forming container bodies from a sheet of paper material comprising means for feeding said sheet, means for slitting said sheet to provide a strip having a width equal to the height of the formed container body, means cooperating with said slitting means for bending the slit edges of said strip in such manner as to cause the ends of the formed container body to flare outwardly, and means for winding said strip into the form of a container body.

19. A machine of the character described for forming container bodies from paper material comprising means including a pair of feed rolls for feeding a strip of paper material suitable for winding into the form of a convolute container body, means carried by said rolls for bending the side edges of said paper strip during advance between the feed rolls, and means for winding said strip in such manner as to cause said bent edges to flare outwardly at the ends of the formed container body.

20. A machine of the character described for forming container bodies from paper material comprising means including a pair of feed rolls for feeding a strip of paper material suitable for winding on a mandrel into the form of a convolute container body, one of said rolls being provided with a plurality of spaced grooves and the other of said rolls being provided with a plurality of spaced circular ribs, said ribs and grooves cooperating to bend the side edges of said paper strip during advance between said rolls, and mandrel means for winding said container body in such manner as to cause said bent edges of the paper strip to turn outwardly from the mandrel and form outwardly flaring ends on the wound container body.

21. A machine of the character described for forming container bodies having a coating on one side thereof from a sheet of paper material comprising means for feeding said sheet, means including a plurality of slitter knives arranged adjacent the coated side of said sheet for slitting said sheet from the coated side into a plurality of strips having widths equal to the height of the formed container bodies, means for bending the side edges of said strips in such manner as to cause the ends of the formed container bodies to flare outwardly, mandrel means for simultaneously winding said plurality of strips into the form of container bodies, and means including a roller for ironing said strips against the mandrel during the winding operation, said roller being provided with a plurality of spaced grooves positioned to correspond with the slits in said paper sheet and said grooves being adapted to receive the outturned ends of the container bodies and prevent flattening of the paper strips during the winding operation.

22. A machine of the character described for forming container bodies adapted to receive end closures thereon comprising means for winding a sheet of paper material upon itself into the form of a multi-wall convolute container body having an inner and an outer seam, means for applying adhesive to said paper sheet to adhesively secure the overlapping layers thereof forming said wall together to maintain said body in the wound form and to provide adhesive on the exterior surface of said wound container body, and means for applying an increased quantity of adhesive to the side edge portions of said sheet that lie at the ends of the container body, and means for terminating said increased supply of adhesive to avoid application thereof to the exterior of said container body.

23. A machine of the character described for forming container bodies from paper material comprising means for winding a sheet of paper material on a mandrel into the form of a convolute container body having a wall thickness comprising a plurality of layers of said paper material, and means for applying adhesive to said paper sheet and a predetermined portion of the outer surface of the wound body, said adhesive applying means including means for applying an increased quantity of adhesive to the edges of the inside layers of the paper material that lie at the ends of the container body and for leaving the end edges of said outer surface substantially free of adhesive.

24. A machine of the character described for forming container bodies from paper material comprising means for feeding a sheet of paper material suitable for winding on a mandrel into the form of a convolute container body having a wall thickness comprising a plurality of layers of said paper mandrel, mandrel means for winding said body, and means for applying adhesive to said paper sheet and a predetermined portion of the outer surface of the wound body, said adhesive applying means including a roller adapted to engage the paper sheet during winding on said mandrel means, said roller being provided with grooves adjacent the side edges of the paper sheet, means for applying adhesive to said roller and to the grooves therein, and means for scraping adhesive from said grooves during a predetermined portion of the winding operation.

25. A machine of the character described for forming container bodies from paper material comprising means for feeding a strip of paper material suitable for winding on a mandrel into the form of a convolute container body having a wall thickness comprising a plurality of layers of said paper material, rotatable mandrel means for winding said body, means for bending the side edges of said paper strip in such manner as to cause the ends of the wound container body to turn outwardly from said mandrel, a roller adapted to engage said paper strip during the winding operation, said roller being provided with grooves positioned adjacent the side edges of the paper strip and adapted to receive the bent edges, means for supplying adhesive to said roller and to the grooves therein for application to said paper strip and to a substantial portion of the outer surface of the container body upon rotation of said mandrel means, said grooves applying an increased quantity of adhesive to said bent edges, and means operable after a predetermined rotation of said mandrel means for scraping adhesive from said grooves to maintain the outer surface of the container body substantially free of adhesive at the end edges thereof.

26. A machine of the character described for forming container bodies from a strip of paper material comprising means for feeding said strip of paper material, means for winding said strip into the form of a convolute container body having inner and outer seams, means for applying adhesive to said strip of paper material to secure the container body in the wound form, means for bending said paper strip to preform a substantial portion of the leading and trailing ends in such manner as to reduce the tendency of the strip to spring away from the wound container body at the inner and outer seams and to effect the retaining of the wound form thereof under the action of said adhesive, means for transferring said formed container body to a label applying station, and means at said station for applying a label to the exterior surface of the container body with initial application of the label taking place in the area of said outer seam and in a direction to promptly apply the label across said outer seam.

27. In a machine of the character described for forming container bodies from paper material in which a web of paper material is supplied from a jumbo roll and means are provided for unwinding said web from said roll, the combination of means for bending said paper web during unwinding from said roll over a predetermined controlled portion thereof, means for shearing said web transversely through said bent portion into blanks having a length suitable for winding into the form of a container body and with a predetermined portion of both leading and trailing ends of said blanks having a tendency to curl in the same direction, means for feeding said severed blanks to a winding mandrel, and mandrel means for winding said blank in convolute form with the direction of said curl such that the tendency of the leading and trailing ends respectively to form a tangent and a chord with respect to the cylindrical container body is substantially eliminated.

28. A machine of the character described for forming container bodies and the like from paper material comprising mandrel means for winding sheets of paper material into the form of container bodies, means for intermittently feeding said paper sheets to said mandrel means, drive means for intermittently rotating said mandrel means in coordinated timed relationship with the operation of said feed means, and means operable upon initiation of the winding operation for taking up slack in the leading portion of a paper sheet advanced by said feed means.

29. A machine of the character described for forming container bodies and the like from paper material comprising mandrel means for winding sheets of paper material into the form of container bodies, means for intermittently feeding said paper sheets to said mandrel means at a winding station, gripper means on said mandrel means for receiving said paper sheets, drive means for intermittently rotating said mandrel means in coordinated timed relationship with the operation of said feed means, stop means for accurately positioning said gripper means during dwell periods of said mandrel means at said winding station, and means associated with said drive means for taking up slack in the leading portion of a paper sheet advanced by said feed means.

30. A machine of the character described for forming container bodies and the like from a sheet of paper material comprising means for feeding said sheet of paper material, rotatable mandrel means for winding said sheet into the form of a convolute container body having an overlapped portion of paper material at the inner seam, means operable after a predetermined rotation of said mandrel means for applying adhesive to said paper sheet while on the mandrel means, and means for applying an initial coating of adhesive to a predetermined portion of said paper sheet to effect positive securing of said overlapped portion at said inner seam of the container body.

31. A machine of the character described for forming container bodies from a sheet of paper material comprising means for feeding said sheet of paper material, rotatable mandrel means for winding said sheet into the form of a convolute container body having overlapping portions of paper material and inner and outer seams, means for applying adhesive to one side of said paper sheet to secure said overlapping portions together, means for applying adhesive to a predetermined portion of the opposite side of said paper sheet to effect positive securing of the paper material at said inner seam of the container body, and means for bending said sheet to preform a substantial portion of the trailing end in such manner as to cause said portion to readily conform to the shape of the wound container body and to be fixedly secured by said adhesive at the outer seam.

32. A machine of the character described for forming container bodies from paper material comprising means for feeding a strip of paper material suitable for forming a container body, means for winding said strip into the form of a convolute container body, means for bending the side edges of said strip in such manner as to cause the ends of the wound container body to flare outwardly, means for applying adhesive to a portion of the outer surface of said container body that lies intermediate said flaring ends, and means for applying a label to the adhesive coated portion of said outer surface with an ironing action while maintaining said flaring ends free from ironing action.

33. In a machine of the character described for forming container bodies from paper material and having means for feeding a sheet of paper material to a winding station, with means at said winding station for winding said sheet of paper into the form of a convolute container body having an outer seam and means for moving a container body to a label applying station, the combination of means for establishing a predetermined positioning of said seam at said label applying station, means for initially applying a label in position closely adjacent said outer seam, and means for winding said label in a direction to overlie said seam shortly after label application begins to provide for promptly securing the outer lap of the container body in wound form.

34. A machine of the character described for forming convolute container bodies from a sheet of paper material comprising means for feeding said sheet of paper material, a member extending transversely with respect to the advance of said paper sheet, means supported by said transverse member for slitting said sheet into strips having a width corresponding to the height of the formed container body, said slitting means comprising a roller and a plurality of cooperating circular cutting knives rotatably supported in spaced individual frame members releasably clamped to said transverse member, and means providing for bending over a longitudinal edge of the strip to provide an outward flare at the end of the wound container body.

35. A machine of the character described for forming container bodies from a web of paper material comprising means for intermittently feeding said web of paper material and for cutting said web into lengths, a member extending transversely with respect to the advance of said paper material, means supported by said transverse member for slitting said paper material to provide a plurality of strips having widths corresponding to the height of the formed container body and a trim strip at each side thereof, said slitting means comprising a roller and a plurality of cooperating circular cutting knives rotatably supported on spaced individual frame members releasably clamped on said transverse member, means for operating said slitting means intermittently in timed relation with said feeding means, means for conveying said trim strips away from said machine, and means for operating said conveying means simultaneously with the operation of said slitting means.

36. A machine of the character described for forming container bodies from a sheet of paper material comprising means for feeding said sheet of paper material, a member extending transversely with respect to the advance of said paper sheet, means supported by said transverse member for slitting said sheet into a strip having a width corresponding to the height of the formed container body, said slitting means comprising a roller and a plurality of cooperating circular cutting knives rotatably supported in individual spaced frame members releasably clamped on said transverse member, said roller being provided with a plurality of grooves, said rotary knives being provided with tapering cutting edges adapted to cooperate with said grooves to cause bending of the side edges of said strip during the cutting thereof, means resiliently urging said knives towards said roll, means for adjusting the pressure of said resilient means, and means for winding said strip in such manner as to cause said bent side edges to provide outwardly flaring ends on the formed container body.

37. A machine of the character described for forming container bodies from a web of paper material comprising means for intermittently feeding said web of paper material and cutting the same into lengths, means for slitting said paper material to provide strips having a width corresponding to the height of the formed container body and a trim strip at each side of said paper web, tubular members adapted to receive said trim strips and guide the trim strips directly to a side of the machine, means including a pair of feed rollers carried by each of said tubular members for moving said trim strips in the tubular members, and means for driving said feed rollers in predetermined timed relation with the periods of feeding of said web.

38. In a machine of the character described for forming container bodies in which a web of paper material is unwound from a large roll, severed into sheets, the sheets are advanced past a slitter means which separates the sheets into a plurality of strips and said strips are fed to a mandrel for winding into the form of container bodies, the combination of a pair of feed rolls arranged on each side of said slitter means, means for intermittently unwinding said paper web and feeding the web to the first of said feed rolls, said unwinding and feeding operation terminating when the advance edge of said web reaches a point just short of said slitter means, means arranged between said unwinding means and said first feed roll pair and operable during dwell of the unwinding means for severing said web into a sheet having a length suitable for winding into the form of convolute container bodies, means for thereafter rotating said pairs of feed rolls to advance said sheet past said slitter means and onto said mandrel for winding thereon, and means for starting rotation of said mandrel from an initial position and effecting the winding of said container bodies thereon in coordinated timed relation with the operation of said feed rolls and the advance of said paper sheet.

39. In a machine of the character described for forming container bodies from a sheet of paper material, the combination of a plurality of mandrel means for receiving and winding a sheet of paper into container bodies, means for successively indexing said mandrel means through a plurality of stations including a winding station, means for feeding a sheet of paper material to the mandrel at said winding station, guide means positioned relatively close to the mandrel at said winding station for guiding said paper sheet into receiving position upon said mandrel, and means for moving said guide means to a clearance position providing for indexing movement of said mandrels following the winding operation.

40. In a machine of the character described for forming container bodies from a sheet of paper material, the combination of a plurality of mandrel means for receiving and winding a sheet of paper into container bodies, means for successively indexing said mandrel means through a plurality of stations including a winding station, means for feeding a sheet of paper material to the mandrel at said winding station, guide means positioned relatively close to the mandrel at said winding station for guiding said paper sheet into receiving position upon said mandrel, means for moving said guide means to a clearance position providing for indexing movement of said mandrels following the winding operation, means for retaining said guide means in said clearance position during the winding operation of the mandrel, and means operative to release said retaining means and to return said guide means to guiding relation with respect to a subsequent mandrel when indexed into said winding station.

41. A process of the character described in which a paper blank comprising a strip of paper material having a continuous impervious coating upon one surface thereof is adapted to be convolutely wound upon itself for the formation of a multi-wall container body adapted to receive an end closure thereon, the steps which comprise bending a side edge of said strip outwardly from the coated side slightly beyond the plane of the strip while maintaining the impervious character of said coating, and thereafter winding the strip into convolute container form about an axis normal to the path of travel of the strip and with the outwardly bent portion overlying itself forming a slight outward flare at the end of the convolute body to facilitate reception of the end closure thereon while avoiding substantial injury to the impervious character of said surface coating.

42. A process of the character described for forming container bodies from paper material which includes the steps of feeding a web of paper material suitable for winding into the form of convolute container bodies, slitting said web longitudinally to provide a plurality of container forming blanks, and bending the longitudinal edges of said blanks prior to the winding thereof in such manner as to cause the end of the wound container bodies formed by said bent edges to flare outwardly.

43. The process as defined in claim 42 in which the bending and slitting steps are performed upon the paper material concurrently.

44. The process as defined in claim 42 in which both longitudinal edges of the blanks are bent to produce an outward flare upon both ends of the wound container bodies.

LINO SCUSA.